(12) United States Patent
Williams et al.

(10) Patent No.: US 9,992,333 B2
(45) Date of Patent: *Jun. 5, 2018

(54) EMERGENCY MOBILE NOTIFICATION HANDLING

(71) Applicant: GreatCall, Inc., San Diego, CA (US)

(72) Inventors: Dean Williams, Solana Beach, CA (US); Pat Merritt, San Marcos, CA (US); Krijn van der Raadt, San Diego, CA (US)

(73) Assignee: GreatCall, Inc., San Diego, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/395,973

(22) Filed: Dec. 30, 2016

(65) Prior Publication Data

US 2017/0111502 A1    Apr. 20, 2017

Related U.S. Application Data

(63) Continuation of application No. 14/936,358, filed on Nov. 9, 2015, now Pat. No. 9,538,006, which is a
(Continued)

(51) Int. Cl.
*H04W 4/12* (2009.01)
*H04M 3/51* (2006.01)
(Continued)

(52) U.S. Cl.
CPC ......... *H04M 3/5116* (2013.01); *H04L 67/306* (2013.01); *H04M 1/72538* (2013.01);
(Continued)

(58) Field of Classification Search
CPC ........... H04W 4/22; H04W 4/02; H04W 4/12; H04W 4/021; H04W 4/18; H04W 4/023;
(Continued)

(56) References Cited

U.S. PATENT DOCUMENTS 5,937,355 A    8/1999   Joong et al.
6,044,257 A    3/2000   Boling et al.
(Continued)

OTHER PUBLICATIONS

Author Unknown; "Commercial Mobile Telephone Alerts (CMAS)"; Federal Communications Commission; Public Safety and Homeland Security Bureau; retrieved Jan. 11, 2012 from http://transition.fcc.gov/pshs/services/cmas.html.

*Primary Examiner* — Diane Mizrahi
(74) *Attorney, Agent, or Firm* — Kilpatrick Townsend & Stockton LLP

(57) ABSTRACT

Methods for operating a call center. In one example implementation, a call center maintains personal profiles of a number of clients of a service provided by the call center. At least some of the personal profiles include contact information for one or more entities designated by the respective clients for receiving information about the respective clients. A text-based electronic emergency notification message is received via an electronic network from a communication device associated with a particular one of the clients. The personal profile of the particular client includes contact information for one or more entities designated by the particular client for receiving information about the particular client from the call center. A notification that the communication device associated with the particular client received the text-based electronic emergency notification message is forwarded to one or more of the entities designated in the personal profile of the particular client.

22 Claims, 15 Drawing Sheets

Related U.S. Application Data continuation of application No. 14/588,020, filed on Dec. 31, 2014, now Pat. No. 9,185,217, which is a continuation-in-part of application No. 14/296,260, filed on Jun. 4, 2014, now Pat. No. 8,995,950, which is a continuation-in-part of application No. 13/286,593, filed on Nov. 1, 2011, now Pat. No. 8,768,291.

(51) Int. Cl.
    *H04W 4/22*     (2009.01)
    *H04L 29/08*     (2006.01)
    *H04M 1/725*     (2006.01)

(52) U.S. Cl.
    CPC ............... *H04W 4/12* (2013.01); *H04W 4/22* (2013.01); *H04M 2242/04* (2013.01)

(58) Field of Classification Search
    CPC ..... H04W 4/06; H04M 1/72538; H04M 3/38; H04M 3/5133; H04M 3/5183; H04M 3/42008; H04M 3/42357; H04M 3/51; H04M 3/5233; H04M 3/523
    See application file for complete search history.

(56) References Cited

U.S. PATENT DOCUMENTS

| | | | |
|---|---|---|---|
| 6,226,510 B1 | 5/2001 | Boling et al. | |
| 6,636,732 B1 | 10/2003 | Boling et al. | |
| 7,092,695 B1 | 8/2006 | Boling et al. | |
| 7,119,675 B2 | 10/2006 | Khandelwal et al. | |
| 7,184,786 B2 | 2/2007 | Mumick et al. | |
| 7,251,471 B2 | 7/2007 | Boling et al. | |
| 7,545,318 B2 | 6/2009 | Derrick et al. | |
| 7,583,974 B2 | 9/2009 | Benco et al. | |
| 7,933,385 B2 | 4/2011 | Dickinson et al. | |
| 8,515,020 B1 | 8/2013 | Amerling et al. | |
| 8,588,733 B2 | 11/2013 | Ferguson et al. | |
| 8,600,338 B2 | 12/2013 | Perrott et al. | |
| 8,768,291 B2 | 7/2014 | Williams et al. | |
| 8,886,158 B2 | 11/2014 | Matsuo et al. | |
| 8,995,950 B2 | 3/2015 | Williams et al. | |
| 9,185,217 B2 * | 11/2015 | Williams | H04M 1/72538 |
| 9,538,006 B2 * | 1/2017 | Williams | H04M 1/72538 |
| 2005/0021344 A1 | 1/2005 | Davis et al. | |
| 2006/0133582 A1 | 6/2006 | McCulloch | |
| 2007/0047520 A1 | 3/2007 | Byers et al. | |
| 2008/0012760 A1 | 1/2008 | Derrick et al. | |
| 2008/0012761 A1 | 1/2008 | Derrick et al. | |
| 2009/0037224 A1 | 2/2009 | Raduchel | |
| 2009/0204977 A1 | 8/2009 | Tavares et al. | |
| 2010/0261448 A1 | 10/2010 | Peters | |
| 2011/0003576 A1 | 1/2011 | Sun et al. | |
| 2011/0088058 A1 | 4/2011 | Velazquez et al. | |
| 2011/0111736 A1 | 5/2011 | Dalton et al. | |
| 2011/0117874 A1 | 5/2011 | Shaw | |
| 2011/0159837 A1 | 6/2011 | Daly et al. | |
| 2012/0190344 A1 | 7/2012 | Yeh | |
| 2012/0195325 A1 | 8/2012 | Connelly et al. | |
| 2012/0296556 A1 | 11/2012 | Burleigh et al. | |
| 2013/0041646 A1 | 2/2013 | Farley et al. | |
| 2013/0109340 A1 | 5/2013 | Williams et al. | |
| 2014/0081669 A1 | 3/2014 | Raduchel | |

\* cited by examiner

PERSONAL CLIENT PROFILE

Client number    555-555-555

Client Information
    Client Name:    Elizabeth Smith (Betty)
    Address:    123 Main St.
        Smalltown, VA
    Age: 86

Special Situations
    Lives alone

Contact Information
    Barbara Jones (Daughter) 555-666-6666
    John Smith (Son)    555-777-7777

Medical Conditions
    Asthma
    Elevated blood pressure
    High cholesterol

Medications
    Blood pressure
    Cholesterol medication

Medicine Allergies
    Penicillin

Preferred Language
    German

Call client on receipt of CMAS alert?
    [x] Land line    [ ] Cell phone    [ ] No Call contacts on receipt of CMAS alert?
    [x] ALWAYS    [ ] ONLY IF CLIENT DOES NOT ANSWER    [ ] NO

FIG. 5

PERSONAL CLIENT PROFILE

<u>Client number</u>     555-555-555

<u>Client Information</u>
    Client Name:     Elizabeth Smith (Betty)
    Address:         123 Main St.
                            Smalltown, VA
    Age: 86

<u>Special Situations</u>
    Lives alone

INFO ACCESS?
YES  NO  LIMITED

<u>Contact Information</u>
| | | YES | NO | LIMITED |
|---|---|:---:|:---:|:---:|
| Barbara Jones (Daughter) | 555-666-6666 | x | | |
| John Smith (Son) | 555-777-7777 | x | | |
| William Doe (Neighbor) | 555-888-8888 | | | x |

<u>Medical Conditions</u>
    Asthma
    Elevated blood pressure
    High cholesterol <u>Medications</u>
    Blood pressure
    Cholesterol medication <u>Medicine Allergies</u>
    Penicillin <u>Preferred Language</u>
    German Call client on receipt of CMAS alert?
    [x] Land line    [ ] Cell phone    [ ] No    [x] Only when not claimed <u>Notify on receipt of CMAS alert:</u>
    Barbara Jones (Daughter) 555-666-6666    TEXT
    John Smith (Son)           555-777-7777    NO
    William Doe (Neighbor)     555-888-8888    EMAIL

FIG. 11

EMERGENCY MOBILE NOTIFICATION HANDLING

CROSS-REFERENCES TO RELATED APPLICATIONS

This application is a continuation of U.S. patent application Ser. No. 14/936,358, filed Nov. 9, 2015, and titled "Emergency Mobile Notification Handling," which application is a continuation of U.S. patent application Ser. No. 14/588,020, filed Dec. 31, 2014, and titled "Emergency Mobile Notification Handling," now U.S. Pat. No. 9,185,217, issued Nov. 10, 2015, which is a continuation-in-part of U.S. patent application Ser. No. 14/296,260, filed Jun. 4, 2014, and titled "Emergency Mobile Notification Handling," now U.S. Pat. No. 8,995,950, issued Mar. 31, 2015, which is a continuation-in-part of U.S. patent application Ser. No. 13/286,593, filed Nov. 1, 2011, and titled "Emergency Mobile Notification Handling," now U.S. Pat. No. 8,768,291, issued Jul. 1, 2014, the disclosures of which are incorporated herein by reference in their entireties.

BACKGROUND OF THE INVENTION

During times of emergency, it is important that officials be able to quickly communicate information about the emergency to large numbers of people. For example, when a tornado or other violent storm is detected, lives may be saved if citizens can be warned to take cover. Similarly, during a wildfire, it may be necessary to contact a large number of residents of the threatened area to effect a rapid evacuation.

Various warning systems exist. For example, the Emergency Alert System in the United States enables officials to interrupt commercial radio and television broadcasts to make emergency announcements. The announcements can be targeted to particular geographic areas.

The Reverse 911® system used in United States and Canada enables officials to place automated telephone calls to landline telephones in specific geographic areas. For example, authorities in a coastal area may use the Reverse 911® system to warn residents in low-lying areas of a possible tsunami after an earthquake has been detected.

AMBER Alerts or similar kinds of notifications are used in many countries to notify the general populace when a child is abducted and believed to be in danger, in hopes that a person hearing the alert will see the child and report his or her location so that authorities can act to protect the child. AMBER Alerts may be broadcast using the Emergency Alert System in the United States, but may also be distributed by many other channels.

Such prior systems may not reach persons who are not at home or who are not watching or listening to broadcast media. Recognizing the near ubiquity of cellular telephones and their ability to receive text messages, the United States federal government is now implementing the Commercial Mobile Alert System, or CMAS. CMAS is scheduled to be deployed by late 2011 in some areas, and nationwide in 2012, and will enable authorities to send text messages to all active cellular devices in targeted geographic areas. These text messages may reach people that would otherwise not be notified by other means. CMAS is intended to overlap with other systems, and will be used to broadcast many kinds of notifications, including weather and fire warnings, AMBER alerts, emergency management instructions, and other kinds of notifications.

Due to the importance of the messages broadcast by CMAS, there is a need to provide ways for additional persons to receive the messages.

BRIEF SUMMARY OF THE INVENTION

According to one aspect, a method of method of operating a call center comprises maintaining in electronic storage, by a computer system comprising a processor executing a program stored in a memory, personal profiles of a number of clients of a service provided by the call center. Each of at least some of the personal profiles includes contact information for one or more entities designated by the respective client for receiving information about the respective client from the call center. The method further comprises receiving, via an electronic network from a communication device associated with a particular one of the clients, a text-based electronic emergency notification message. The personal profile of the particular client includes contact information for one or more entities designated by the particular client for receiving information about the particular client from the call center. The method further comprises forwarding, to one or more of the entities designated in the personal profile of the particular client, a notification that the communication device associated with the particular client received the text-based electronic emergency notification message.

BRIEF DESCRIPTION OF THE DRAWINGS

FIG. 5 illustrates an example personal profile.

FIG. 11 illustrates a simplified example personal profile in accordance with embodiments of the invention.

DETAILED DESCRIPTION OF THE INVENTION

The ensuing description provides preferred example embodiment(s) only, and is not intended to limit the scope, applicability or configuration of the disclosure. Rather, the ensuing description of the preferred example embodiment(s) will provide those skilled in the art with an enabling description for implementing a preferred example embodiment. It is understood that various changes may be made in the function and arrangement of elements without departing from the spirit and scope as set forth in the appended claims.

Specific details are given in the following description to provide a thorough understanding of the embodiments. However, it will be understood by one of ordinary skill in the art that the embodiments may be practiced without these specific details. For example, systems, structures, and other components may be shown as components in block diagram form in order not to obscure the embodiments in unnecessary detail. In other instances, well-known processes, procedures and techniques may be shown without unnecessary detail in order to avoid obscuring the embodiments.

Also, it is noted that individual embodiments may be described as a process which is depicted as a flowchart, a flow diagram, a structure diagram, or a block diagram. Although a flowchart may describe the operations as a sequential process, many of the operations may be performed in parallel or concurrently. In addition, the order of the operations may be re-arranged. A process may be terminated when its operations are completed, but could have additional steps not included in a figure. Furthermore, embodiments may be implemented by manual techniques, automatic techniques, or any combination thereof.

Figure 1:
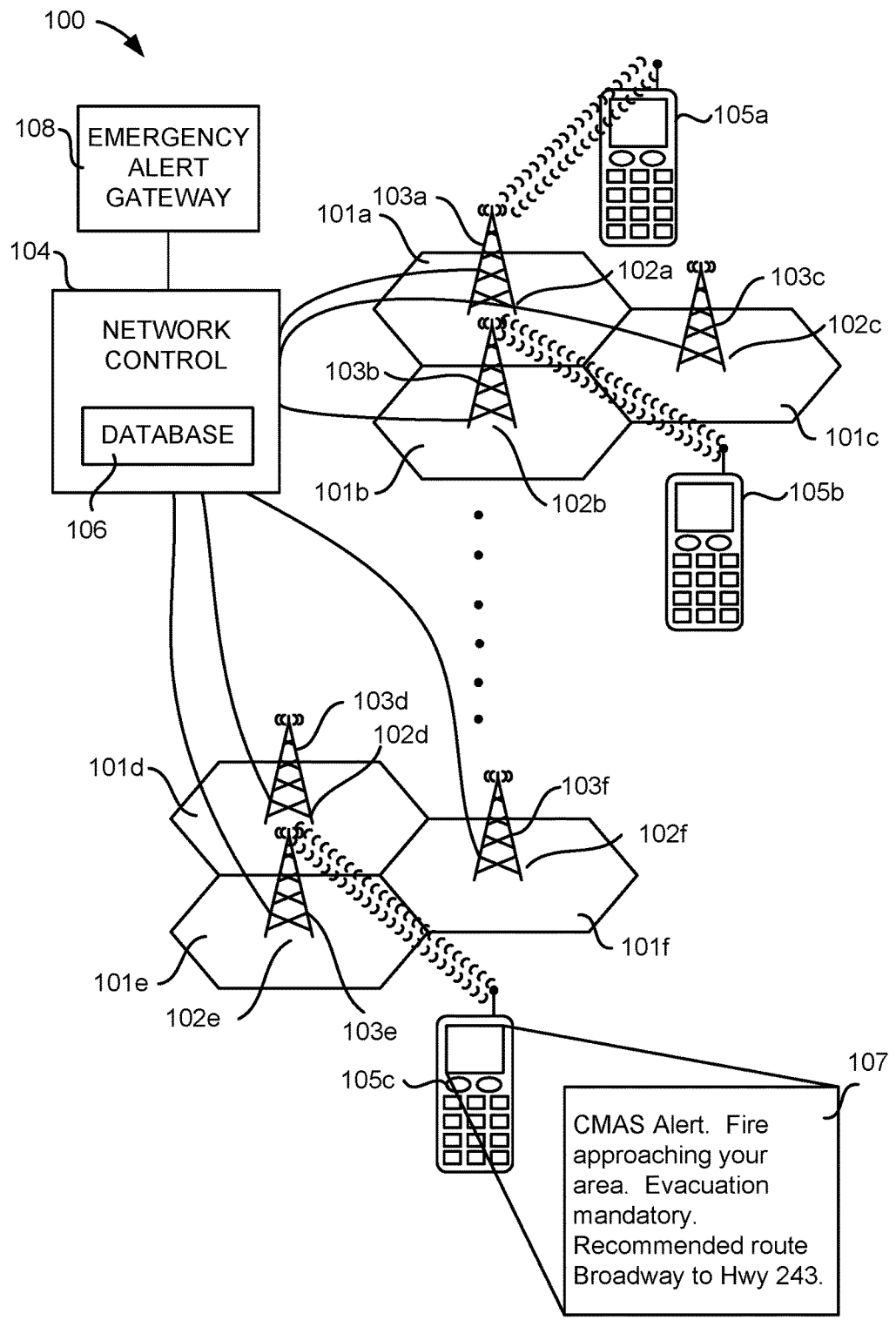
FIG. 1 is a simplified schematic diagram of a cellular telephone network, in accordance with embodiments.

FIG. 1 is a simplified schematic diagram of a cellular telephone network 100, in accordance with embodiments. Cellular networks are an especially efficient way to provide mobile telephone service. Each cell 101a-f is served by a respective one of base stations 102a-f, each of which may include an antenna mounted on one of towers 103a-f. Each cellular telephone active in a particular cell can bidirectionally interact with the base station of the cell, enabling full duplex communication of data and/or voice. Each of cells 101a-f is capable of communicating with mobile telephones within the respective cell according to a physical interface scheme (e.g., CDMA, LTE, GSM, GPRS, WiMax, etc.). Each of base stations 102a-f typically is capable of communicating simultaneously with several dozen or more different mobile telephones such as mobile telephones 105a-c.

Adjacent cells use different frequencies or coding to avoid interference. In this way, many mobile telephones can be supported using a limited spectra. The size and density of the cells 101a-f may be determined in part by the demand for service. While only six cells 101a-f are shown in FIG. 1, many other cells may be present, such that the cells collectively cover large contiguous areas. Special hand-off protocols may be used for maintaining communication with a particular telephone that moves from one cell to another during a call.

As shown in FIG. 1, each of base stations 102a-f communicates with a network controller 104. It will be understood that FIG. 1 is highly simplified, and network controller 104 represents a wide array of hardware, software, and other components performing a wide variety of functions. For example, network controller 104 may route calls between cells 101a-f and outside telephone providers, monitor telephone usage, maintain billing records for individual telephone accounts, perform diagnostic tests, and perform many other functions.

Network controller 104 may also include interfaces between network 100 and other networks, organizations, or services.

Each active mobile telephone, such as mobile telephones 105a-c, "registers" with a nearby base station, and network controller 104 keeps a database 106 listing which of mobile telephones 105a-c is registered with which of base stations 102a-f. Network controller 104 uses database 106 to route incoming calls. For example, when a call is received at network controller 104 and intended to be routed to mobile telephone 105b, network controller 104 consults database 106 to determine that mobile telephone 105b is registered with base station 102b, and routes the incoming call accordingly.

The geographical locations of base stations 102a-f are fixed, and known to the operator of network controller 104. Thus, by virtue of database 106, network controller 104 "knows" at nearly all times the location of every active mobile telephone subscribed with the operator of network controller 104, at least to the accuracy of the size of cells 101a-f. The size of each cell depends on the expected density of mobile telephones in a given area, on the topology of the surrounding landscape, and other factors, but typically cells range from a few hundred yards to several miles across. A particular geographical area may be served by more than one telephone service provider. Different telephone service providers may share network infrastructure, or may maintain separate controllers, base stations, towers, and other hardware. Each telephone service provider similarly "knows" the locations of all of its active subscribed mobile telephones.

Because the locations of nearly all active mobile telephones are known, the cellular network is naturally adapted to providing alerts to targeted geographic areas. With the cooperation of the telephone service providers, an alert can be sent to all active mobile telephones registered to a list of particular base stations known to be in the targeted area. Nearly all major cellular telephone service providers have agreed to handle CMAS alerts. In addition, the relatively small size of CMAS messages (about 90 characters each) may enable large numbers of messages to be sent to large numbers of mobile telephones without overwhelming the available network capacity.

In the example depicted in FIG. 1, a geographical area encompassing cells 101d-f may be in danger from a wildfire, and evacuation has been ordered. Emergency alert gateway 108 sends a message 107 which may include an indication of the geographic areas affected to network controller 104, which in turn sends message 107 to all mobile telephones registered with base stations 102d-f, for example mobile telephone 105c. The message is not sent to mobile telephones in other areas, for example mobile telephones 105a and 105b.

In some situations, some persons may not receive a CMAS alert, despite having a mobile device capable of receiving the alert. Embodiments of the invention enable more persons, for example subscribers to an assistance service provided by a private organization, to receive CMAS alerts who might otherwise not receive them.

Figure 2:
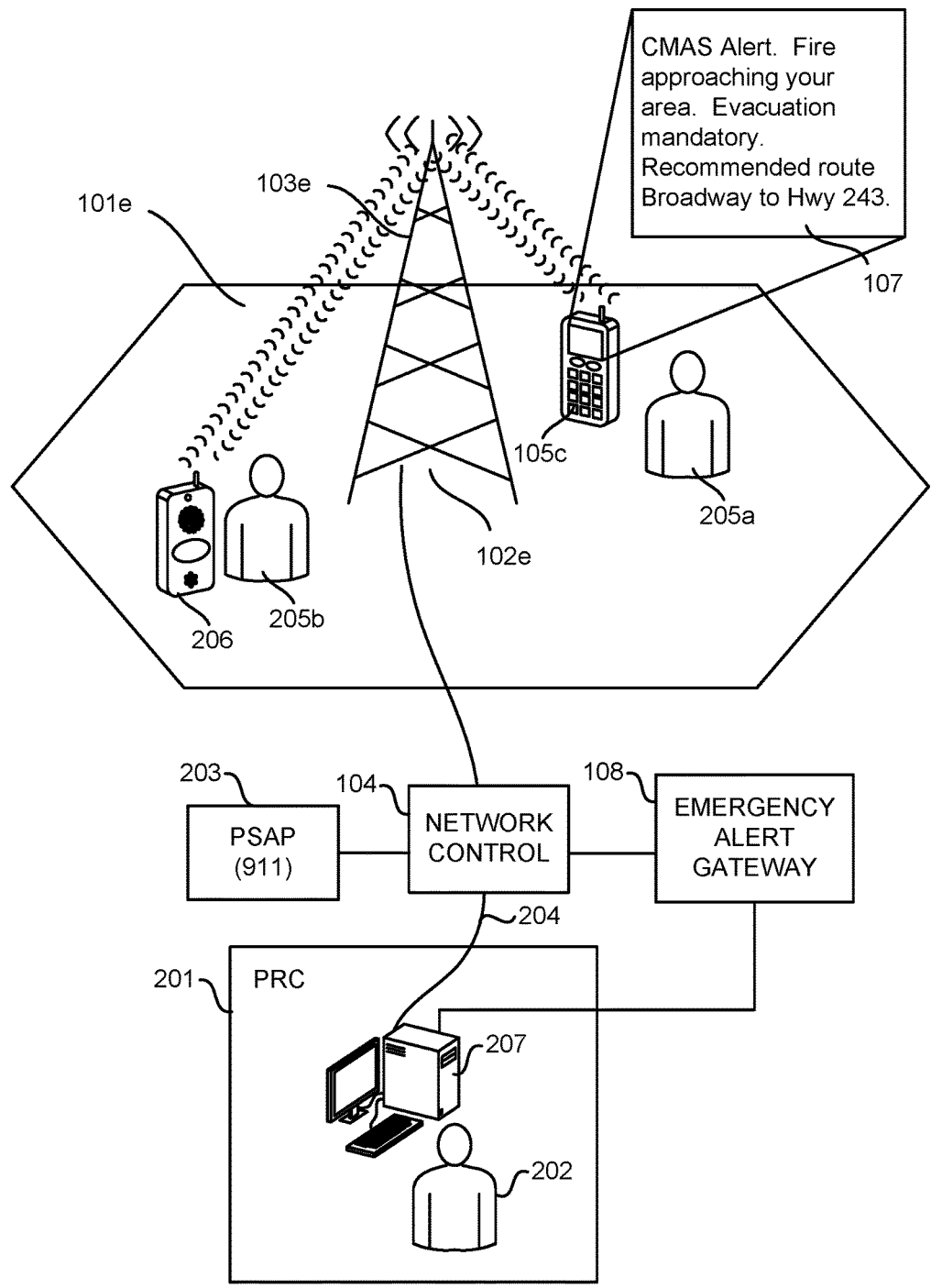
FIG. 2 illustrates the operation of a private response center (PRC), in accordance with embodiments.

FIG. 2 illustrates the operation of a private response center (PRC) 201, in accordance with embodiments. Private response center 201 may be operated, for example, by a response service provider who offers personalized assistance to clients who subscribe to the service. In some embodiments, the response service provider may offer personal health management advice, concierge services, navigational assistance, technical support for telephones used in conjunction with the service, or other kinds of personalized services deliverable by telephone. Private response center 201 may be staffed by customer service representatives 202 who answer inquiries from clients of the service. Such a service may especially appeal to clients with health or other impairments. For example, the service could include weekly or daily calls to the client for verification that the client is doing well, and if not, the customer service representative may offer to contact a family member, health care provider, or other resource that may be helpful to the client. The service could include these and other services sold as a package. Alternatively, PRC 201 may be a fully automated service designed to operate without human intervention.

Private response center 201 is not intended to be a substitute for a public safety answering point (PSAP) 203. A client of the service offered by private response center 201 would still be expected to dial 9-1-1 to reach PSAP 203 in the event of an emergency.

In one example scenario, the service provider that operates private response center 201 may also be a cellular telephone service provider, and may offer a private assistance service as an adjunct to cellular telephone service. The private response center 201 can be contacted for non-emergency service through a phone number, speed dial or other shortcut, for example by activating a 5 and * key combination. The connection 204 between network controller 104 and private response center 201 is schematic. The actual connection could be by way of the Internet, a wireless connection, a voice-over-Internet-protocol (VOIP) connection, a cellular telephone connection, or private response center 201 could be reached through a conventional wireline telephone system, or any other suitable connection method that enables a telephone user to reach private response center 201 by calling a telephone number. Private response center 201 may be reachable via multiple methods.

PRC 201 includes a computer system 207 that may be used for various functions. For example, information about calls from clients may be displayed to customer service representative 202. Computer system 207 may store personal information gathered from clients that may be helpful in rendering assistance to the clients. Computer system 207 may assist customer service representative 202 in the performance of his or her job, for example automating telephone dialing and the like. While computer system 207 is illustrated as a single computer, it will be recognized that the term "computer system" encompasses many different kind of installations, including systems of multiple computers linked together. The multiple computers may be co-located or widely dispersed.

FIG. 2 also illustrates two clients 205a and 205b of PRC 201, currently positioned in cell 101e. Client 205a uses a fully-featured mobile telephone 105c, while client 205b uses a simplified communications device 206, described in more detail below. As illustrated in FIG. 2, emergency alert gateway 108 has sent a CMAS message 107 via network controller 104, and the message 107 is displayed by mobile telephone 105c. Alternatively CMAS message 107 may be sent to both mobile telephone 105c and to PRC 201. If mobile telephone 105c does not have a method of receiving CMAS messages, it could retrieve the message from PRC 201 in a format in which mobile telephone 105c can communicate to its user. This configuration would also allow PRC 201 to receive CMAS message 107 and convert it to any format necessary and send the message to mobile telephone 105c, based on either geo-location information obtained via voice, data, or other communications from mobile telephone 105c, social media, crowdsourcing, or information obtained from friends and family.

The capability for PRC 201 to receive a CMAS message directly and then re-transmit it to the appropriate customers may be especially useful when certain customers' communications devices may not be compatible with the transmission format of CMAS alerts, for example during a transition period when many installed mobile telephones cannot receive cell broadcast messages, as described in more detail below.

Figure 3:
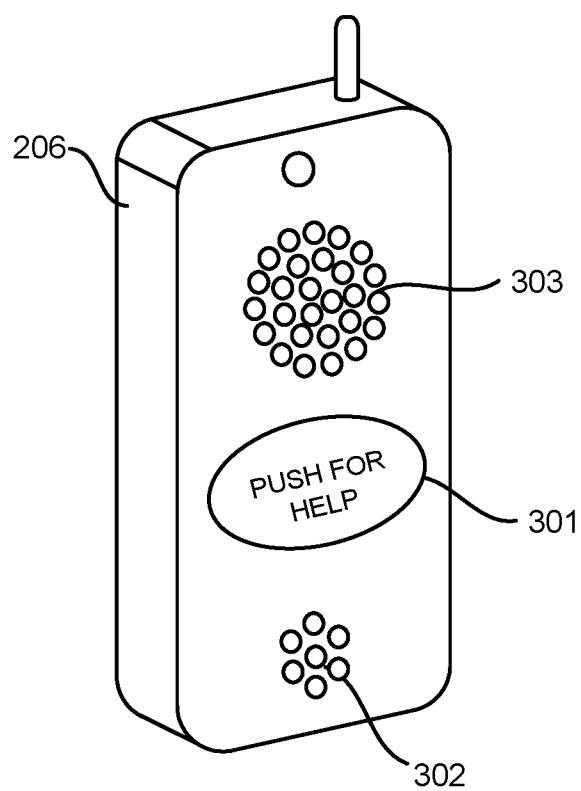
FIG. 3 illustrates a simplified communications device in accordance with embodiments.

FIG. 3 illustrates simplified communications device 206 in more detail, in accordance with embodiments. Example communications device 206 may internally be a fully-featured cellular telephone, but has a simplified input interface comprising only one button 301. Communications device 206 may also be referred to as a "personal security device" or an "emergency communicator." A client of private response center 201 may wear communications device 206 on his or her person, and can use it to contact private response center 201 whenever assistance is needed. For example, communications device 206 may be configured to dial private response center 201 when button 301 is pressed. This greatly simplified input interface may be especially helpful to clients with impairments such as poor vision or coordination that make it difficult to operate a conventional cellular telephone that has many small keys. The single-button interface assures that private response center 201 will be called without the client having to press a sequence of keys. In the event of an emergency, private response center 201 may route the call to the proper authorities, if necessary. Communications device 206 further includes a microphone 302 and a speaker 303, enabling telephone or telephone-like communication.

Because simplified communications device 206 may internally be a fully-featured cellular telephone, it may receive CMAS message 107, but because it lacks a display, it cannot display the message, and client 205b may not receive CMAS message 107. And even though mobile telephone 105c used by client 205a is a fully-featured telephone including a display, CMAS message 107 may still not reach client 205a, for any of a number of reasons. For example, client 205a may have a visual impairment and may not be able to see the display of mobile telephone 105c, or client 205a may speak and read a different language that the language of the CMAS alert, and may thus not be able to read the message.

Embodiments of the invention provide for additional persons to receive CMAS alerts, and provide other benefits. For example, private response center 201 may be able to supplement the operation of the CMAS system so that alerts reach and are understood by additional persons. It will be recognized that embodiments of the invention may be used with other kinds of text-based messages, and are not limited to CMAS alerts.

In one example embodiment, a communications device capable of receiving text-based messages, for example mobile telephone 105c or simplified communications device 206, is programmed to recognize that it has received a text-based emergency notification message, and to forward the message to PRC 201 for conversion to audio. PRC 201 then transmits data or signals back to the communications device, which can audibly play the message for the client.

Figure 4:
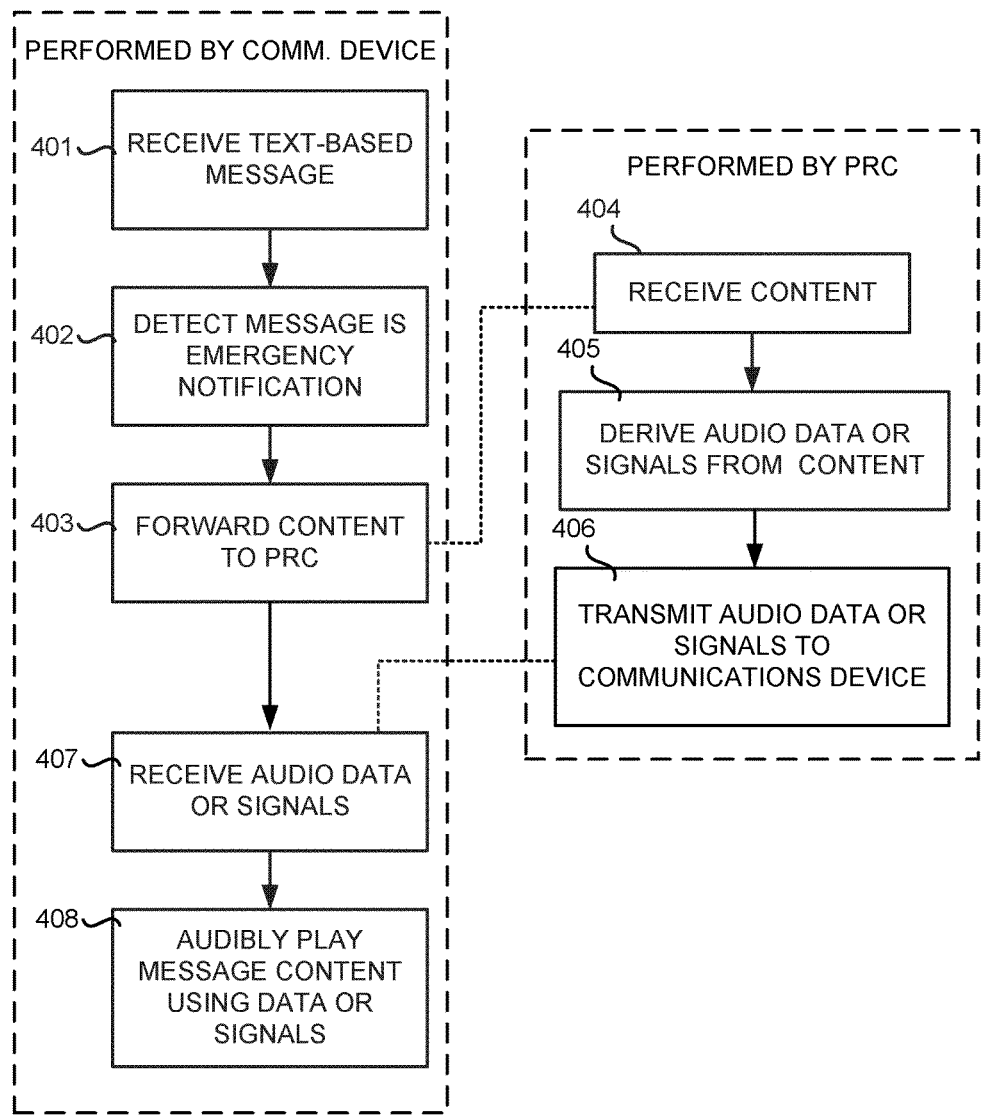
FIG. 4 illustrates a method in accordance with embodiments.

FIG. 4 illustrates a method in accordance with embodiments. In step 401, a communications device, such as mobile telephone 105c or simplified communications device 206, receives a text-based message. The text-based message may be an SMS message, a cell broadcast message, or another kind of text-based message.

In step 402, the communications device recognizes that the received message is an emergency alert message, for example a CMAS alert. The recognition may be done by any suitable means. For example, the communications device may recognize that the text-based message was sent from an address dedicated to sending CMAS alerts or other kinds of emergency alert messages. Or the communications device may examine the content of the message and recognize based on the content that the message is an emergency alert message.

In step 403, the communications device forwards at least some of the content of the message to PRC 201. For example, the communications device may simply forward the message to an address maintained by PRC 201 for handling emergency alerts forwarded by clients' devices. Or the communications device may extract only the body of the message and construct a new text-based message to forward to PRC 201. Or the communications device may extract pertinent parts of the message content for forwarding. The message content may be forwarded in other formats than text or SMS messaging. For example, the communications device may place a data call to PRC 201 including the forwarded content.

In step 404, the message content forwarded by the communications device is received at PRC 201.

In step 405, PRC 201 derives, from the forwarded content, data or signals that render at least some of the content of the text-based electronic message into an audio format. For example, computer system 207 may perform an automated text-to-speech conversion of the forwarded content, and may generate a digital audio file containing an audio rendering of the message content. In other embodiments, a person at PRC 201 may simply read the forwarded content, and his or her voice may be recorded to create a digital file or an analog recording. Additional contextual information may be added if desired. For example, audio data derived from example CMAS message 107 may audibly indicate:

This is your care center with an important message. Your communicator has received an emergency alert from the National Weather Service. A hurricane is approaching your area and you are required to evacuate. The sheriff recommends that you take Broadway to highway 243. This message will repeat until you press the button on your communicator to hang up. If you need additional assistance, press the button again to call the care center . . . .

It will be recognized that PRC 201 may receive forwarded text-based messages from more than one subscriber. In that case, it may be necessary to derive an audio rendering of each CMAS alert only once, and the result stored for communicating to subsequent callers.

In step 406, PRC 201 transmits the data or signals to the communications device, and in steps 407 and 408 the communications device receives the audio data or signals and audibly plays them, for example through speaker 303. The transmission may be accomplished in any suitable way. For example, PRC 201 may place a telephone call to the communications device, and play the audio rendering over the open telephone connection. Or PRC 201 may place a data call to the communications device and transmit a digital file, which is then played by the communications device.

The communications device may provide other information as well. For example, communications device such as simplified communications device 206 or mobile telephone 105*c* may include a global positioning system (GPS) receiver, WiFi triangulation capability, or other near field communication capability, and may thus be able to ascertain its geographical location with more precision that is possible from the mere recognition that the device is registered with base station 102*e*, and therefore resides in cell 101*e*. The communications device may provide geographical location information to PRC 201 in conjunction with the forwarding of the CMAS alert. Should a client, for example client 205*b*, call PRC 201 after receiving the CMAS alert, customer service representative 202 may be able to use the geographical information to provide additional assistance to the client, for example revised evacuation directions, or possibly even reassurance that the client is not in danger, if it can be determined that the client is in a portion of a cell not endangered by the instant threat. For example, based on geographical information provided by the communications device, PRC 201 may be able to determine that the client is calling from a high seaside bluff, and is not in danger from a tsunami warning, even though the caller may be only a short distance from locations that are in imminent danger.

The involvement of PRC 201 enables other enhancements and services. For example, PRC 201 may store a personal profile about a client such as client 205*b*. An example personal profile is shown in FIG. 5. The personal profile may include health-related information, emergency contact numbers, and other kinds of information about the client that may be helpful to personnel at PRC 201 in rendering assistance to the client. For example, the profile of FIG. 5 indicates that the client's preferred language is not English. Accordingly, PRC 201 may translate emergency alert messages into the client's preferred language before transmitting the audio data or signals to the client's communications device. The translation may be accomplished by any suitable method. For example, computer system 207 may perform or obtain a machine translation of the message content before rendering the content into an audio format, or the message may be translated by a human translator before an audio rendition of the message is created.

Other services and actions are possible as well. For example, the client's profile may contain a standing instruction to notify the client's designated emergency contacts whenever an emergency alert is received from the client's communications device. PRC 201 may also tailor its response based on other kinds of content in clients' personal profiles. For example, the example profile of FIG. 5 indicates that the profiled client suffers from asthma. Example CMAS message 107 relates to a wildfire, which would be of particular concern to asthma sufferers. PRC 201 could accordingly prioritize its actions based on the type of emergency and the client's medical condition, for example calling the emergency contacts of asthma suffers first in the event that a large number of emergency alerts relating to a fire are received from a large number of clients' communications devices. In another example, if a CMAS alert relates to a hurricane, PRC 201 may prioritize its actions so that clients whose profiles indicate they live very close to the coast are serviced before clients who live further inland. In yet another example, PRC 201 may escalate its response based on the nature of the emergency and/or information in the client's profile. For example, if a client's profile indicates that the client is on a respirator, PRC 201 may act to contact the client immediately in the event of a power outage, and may contact emergency services if the client is not reached.

Figure 6:
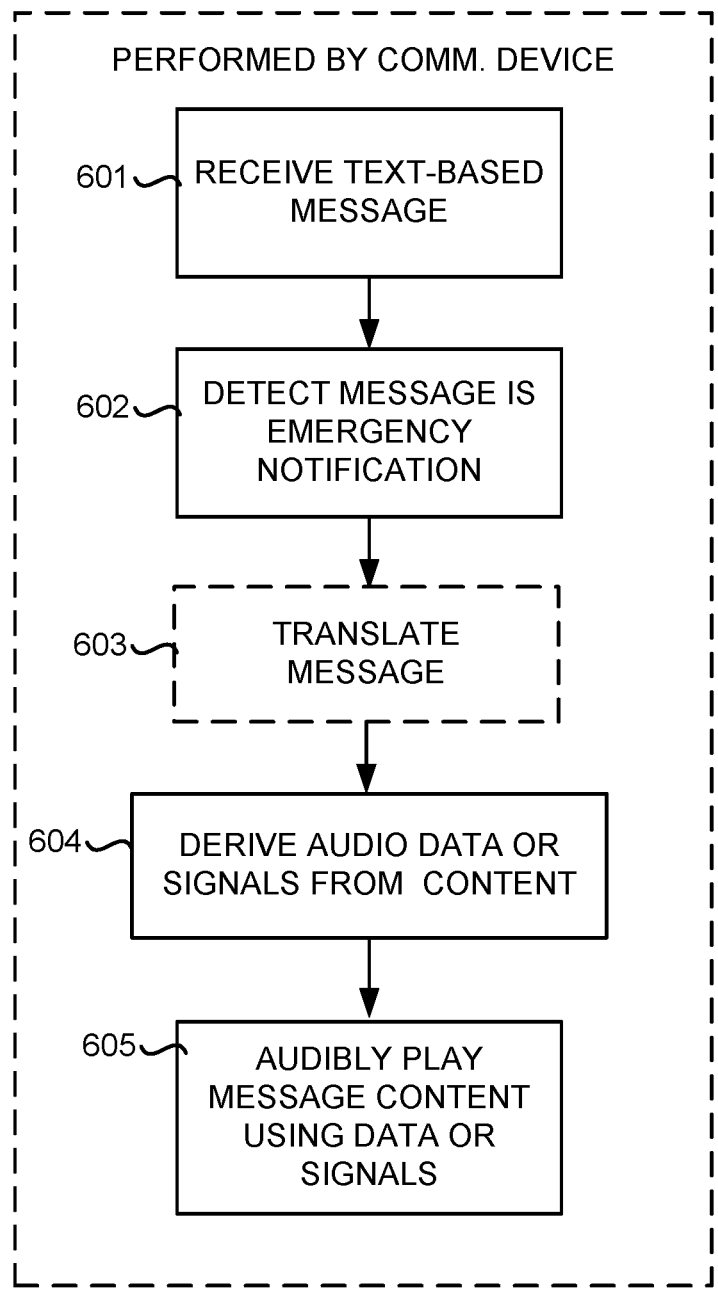
FIG. 6 illustrates a flow chart of a method in accordance with some embodiments.

In other embodiments, a communications device such as simplified communications device 206 or another device may render an incoming CMAS alert into an audio format on its own, without the need to forward any of the content to another location such as PRC 201. FIG. 6 illustrates a flow chart of a method in accordance with some embodiments. In step 601, the communications device receives a text-based message, such as an SMS message. In step 602, the communications device detects that the message is an emergency notification message, for example by recognizing that the source address of the message is an address reserved for sending CMAS alerts, or by determining from the message content that it is an emergency notification message, or by any other suitable means. In optional step 603, the communications device may translate or obtain a translation of at least some of the message content into another language. For example, the communications device may include machine translation software to be executed by an on-board processor, to perform the translation. The communications device may be pre-configured with a capability for translating text into a particular preferred language. In other embodiments, the communications device may forward the message content to a remote translation service, which may or may not be affiliated with PRC 201, and may receive a translated version of the message in return.

In step 604, the communications device derives, from the content of the text-based message, data or signals that render at least some of the content of the text-based message in an audio format. For example, the communications device may include embedded text-to-speech conversion software that is executed by an on-board processor to perform the conversion. In step 605, the communications device plays the audio rendition of the message content, for example via speaker 303.

Figure 7:
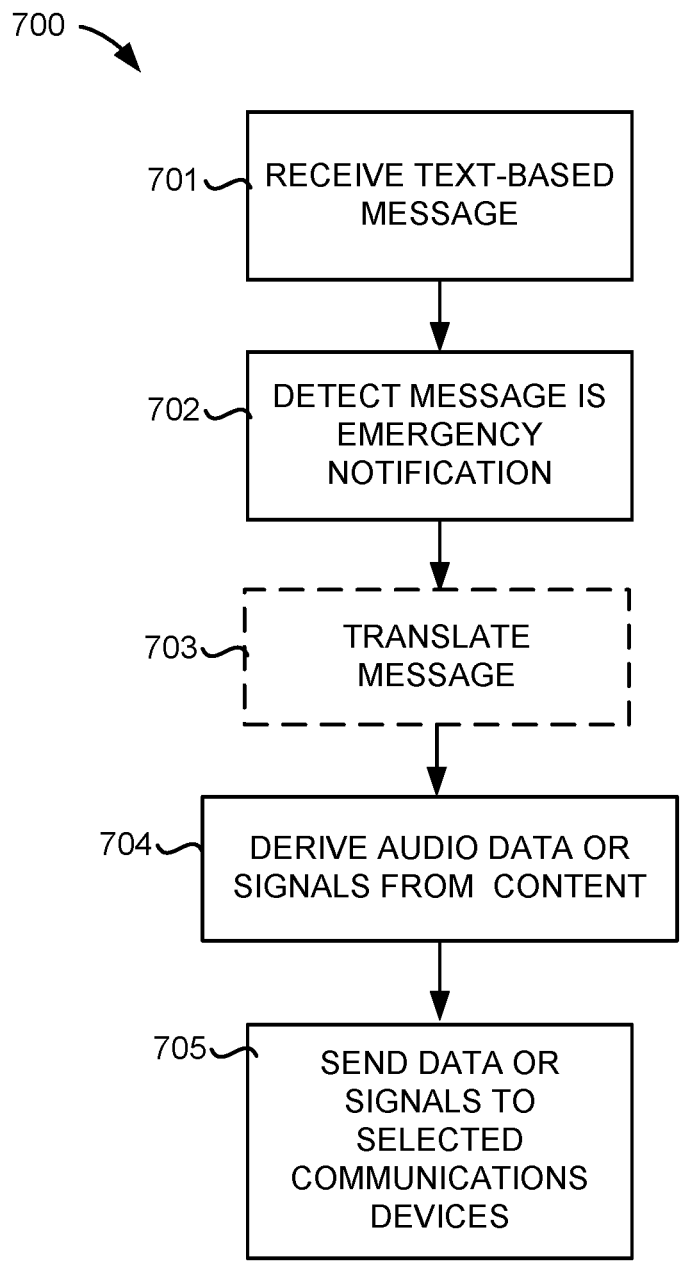
FIG. 7 illustrates a flow chart of a method in accordance with another embodiment.

FIG. 7 illustrates a flow chart of a method 700 in accordance with another embodiment. The steps of method 700 may be performed by PRC 201, for example with the assistance of computer system 207, and may be especially helpful when one or more clients of PRC 201 uses a mobile communications device that cannot directly receive some text-based emergency notifications. For example, one way of transmitting a message to a large number of mobile devices is through the use of cell broadcast. In cell broadcast, a single message is simultaneously sent to all mobile devices in a particular geographic area, such as to all devices registered with a particular tower. This is in contrast to sending a text-based message such as an SMS message separately to each of the devices registered with the tower.

While cell broadcast is an efficient way to reach a large number of devices, some devices may not yet be configured to receive cell broadcast messages, and therefore may miss out on emergency notifications sent by cell broadcast. Since such a device does not receive the message at all, it also is not triggered to send the message to PRC 201 for conversion to audio format.

PRC 201 may still be able to assist clients using mobile telephones that cannot receive emergency notification messages due to an incompatibility with the medium of transmission of the messages, for example an inability to receive messages via cell broadcast. In some embodiments, PRC 201 can receive the text-based emergency notification messages without them being forwarded by each client within the area targeted by the notifications. For example, as shown in FIG. 2, PRC 201 may receive messages directly from emergency alert gateway 108, by prior agreement. In another example, PRC 201 may recognize that an emergency notification message has been broadcast by a particular tower based on the fact that several clients serviced by that tower have called for assistance after receiving the notification, or because communications devices used by clients in the affected area have forwarded the notification for translation to audio format. Whatever the way in which PRC 201 receives the emergency notification message, PRC 201 may recognize that there are clients within the targeted area who may not have received the notification. PRC 201 may then take steps to notify those clients, for example by method 700.

In step 701, PRC 201 receives a text-based message, and in step 702, PRC 201 detects that the text-based message is an emergency notification message. Optionally, PRC 201 may translate the message into one or more different languages at step 703, for transmission to clients who prefer to communicate in languages other than the original language of the emergency notification. In step 704, data or signals are derived from the content of the text-based message, rendering at least some of the content of the text-based electronic message into an audio format. In step 705, the data or signals are sent to one or more selected communications devices associated with PRC 201, for example communications devices owned by clients of PRC 201. In this scenario, the message can be thought of as being "pushed" to the clients' devices, rather than being "pulled", as would be the case for devices that received the notification directly and requested translation of the message into an audio format.

The selected communications devices may be identified as being within the geographical area to which the emergency notification message is targeted. PRC 201 may be able to identify which of its clients' devices are within the targeted geographical area by any suitable means. For example, some clients' devices may periodically report their locations to PRC 201 as part of a client-requested tracking program. Or PRC 201 may assume that any communications device recently used to contact PRC 201 from the targeted area is still within the targeted area. Or PRC 201 may simply use the home addresses of its clients and assume that any client with a home address within the targeted area is most likely within the area, and push the emergency notification message to those clients, knowing that the few clients who are away from home may be unnecessarily notified.

In another embodiment, a technique similar to that of FIG. 7 may be used to forward text-based notifications in text format, for example as SMS messages, without converting them to an audio format. In this way, PRC 201 can notify at least some of its clients who cannot directly receive alerts, in a manner similar to the original text-based alert.

In other embodiments, PRC 201 may tailor its sending of emergency notification messages to clients' devices based on the capabilities of the respective devices. For example, PRC 201 may send audio renditions of messages to client devices that cannot display text. In another example, PRC 201 may relay a notification message in text format to devices that can display text but could not receive the original notification message, for example because the message was sent by cell broadcast and the client device does not have the capability to receive cell broadcast messages. Preferably, PRC 201 can determine the capabilities of its clients' devices. In other embodiments, PRC 201 may tailor its sending of emergency notification messages to clients' devices for other reasons. For example, PRC 201 may send audio renditions of messages to devices used by clients with visual impairments, who may not have been able to read the original text-based messages. PRC 201 may automatically recognize that a client is visually impaired by retrieving the client's profile information, by querying the client's device as to the presence of specific software or settings that may indicate visual impairment, or by another method.

Figure 7A:
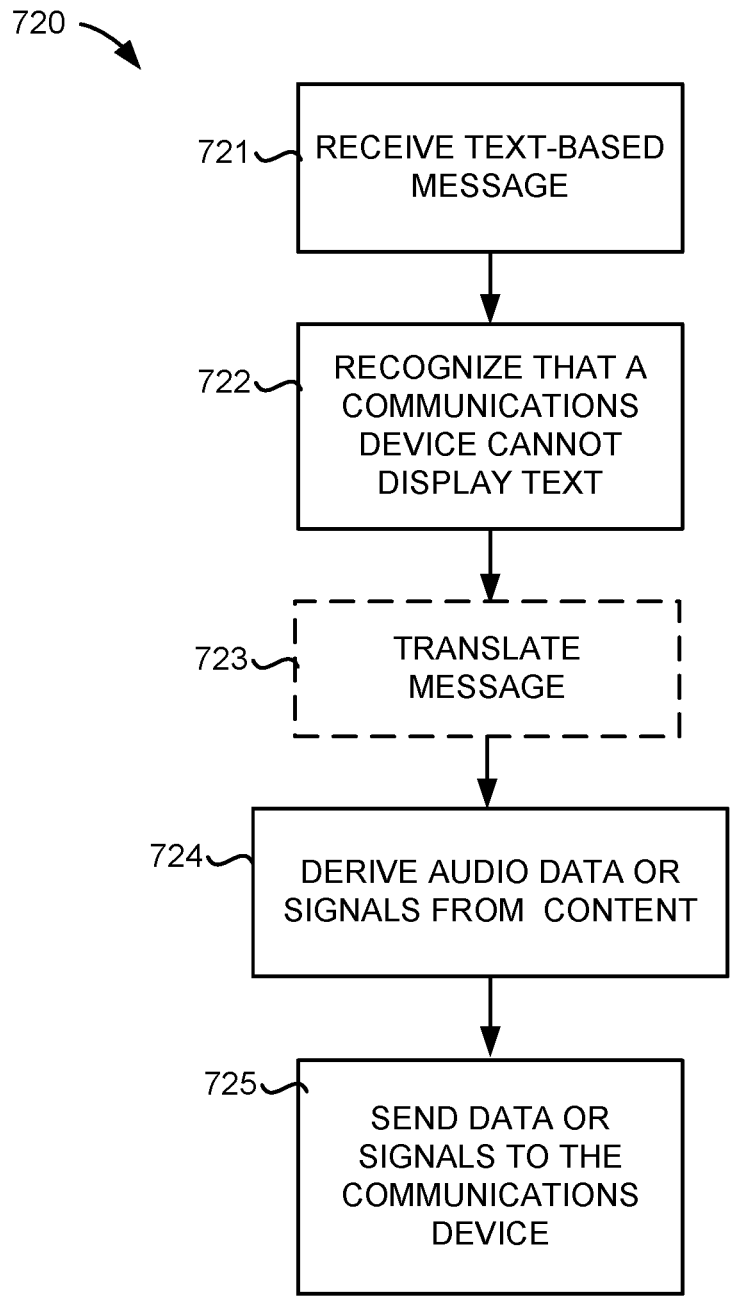
FIG. 7A illustrates a flow chart of a method in accordance with another embodiment.

FIG. 7A illustrates a method 720 according to such an embodiment. The steps of method 720 may be performed by PRC 201, for example with the assistance of computer system 207.

In step 721, PRC 201 receives a text-based message. For example, the text-based message may be an emergency notification message that originated from an official emergency alert gateway, or may be another kind of message. As is described above, PRC 201 may receive the message in any of a number of ways. For example, PRC 201 may receive the message directly from an official emergency alert gateway, may receive the message from one of its clients when the client's device forwards the message for conversion to audio, or may receive the message some other way.

In step 722, PRC 201 recognizes that the device used by at least one client cannot display text. For example, PRC 201 may have identified the particular client as being in the geographical area targeted by an emergency alert message, and may wish to send the message in a format or by a channel that the user's device can receive and process if needed. The determination of whether a particular user's device can display text may be done in any suitable way.

For example, upon enrollment in a service offered by PRC 201, the client may specify the capabilities of his or her device, either by listing the capabilities, by providing the make and model number of his or her device, or by another method. PRC 201 may record this information, for example in the user's profile, and may simply retrieve it when needed. The recorded information might explicitly indicate the device capabilities, or PRC 201 may be able to determine the device capabilities from the information. For example, if the make and model of the user's device is recorded, PRC 201 may access a library of device information to determine the device capabilities based on the model number. In some embodiments, the make and model of the client's device may be provided upon installing an application program on the device, as part of enrollment in the service offered by PRC 201.

In another example technique for determining the capabilities of the user's device, PRC 201, for example using computer system 207, may query the device electronically. Such a query may take the form of an SMS message sent to the device requesting a response, a data call to the device requesting a response, a traditional telephone call to the device requesting a response, or another kind of query. The device may be specially programmed to recognize the query and respond appropriately. Steps may be taken to ensure that the query is silent, to avoid disturbing or alarming the user of the device. For example, when a traditional phone call is used to query the device, the querying phone call may be placed from a telephone number reserved for such queries. The device may be specially programmed to recognize the source of the incoming call as the reserved number, and may answer without ringing. Thus the user may not know that his or her device has been queried. Once the query is received, the device can respond in an appropriate manner, for example via a return SMS message, via a tone-based data exchange over the telephone connection, via a data packet sent to PRC 201, or by another means. The response may explicitly list capabilities of the device, or may provide information, such as a device make and model number, from which the device capabilities can be determined.

In yet another example technique for determining the capabilities of the user's device, the device itself may provide PRC 201 with information from which its capabilities can be determined, either specifically for that purpose or in conjunction with another kind of message. In some embodiments, the device may be specially programmed to report to or check in with PRC 201, occasionally or periodically, for a variety of reasons. For example, the device could periodically send a check-in message to PRC 201 to report the geographical location of the device, to verify that the device is operational, or for other reasons. In another example, the device may be programmed to notify PRC 201 if the device is moved out of a specified geographical area. Such messages may be described as being "pushed" from the device to PRC 201, because they are instigated by the device, and are not response to inquiries from PRC 201. Other occasions for sending check-in or other pushed messages may be envisioned. Information usable to determine the device capabilities may be sent in conjunction with a pushed message being sent for one of these reasons or another reason. A pushed message may be in any suitable format, for example a text-based format such as SMS, a data call, a telephone call, or another format.

Referring again to FIG. 7A, in step 723, PRC 201 may optionally translate the text-based message into a different language.

In step 724, PRC 201, in response to the determination that the particular user device cannot display text, derives data or signals rendering at least part of the content of the text-based message into an audio format. The conversion may be performed by any suitable means, for example by an automated text-to-speech conversion, by recording a human voice, by retrieving data or signals that resulted from previous conversion of a like or similar message, or by another method.

In step 726, PRC 201 sends the data or signals to the communications device, where it can be audibly played to the client user.

In this way, clients of PRC 201 who may not have otherwise received important emergency alerts or other information can be notified by PRC 201.

In some embodiments, PRC 201 may tailor notifications to other clients' devices having other sets of capabilities. For example, another particular client of PRC 201 may use a device that can display text-based messages, but cannot receive messages by cell broadcast. PRC 201 may determine the capabilities of such a device by any of the techniques described above. In response to determining that a particular device can display text but cannot receive cell broadcast messages, PRC 201 can forward some or all of the content of a cell-broadcast text-based message to the user device in a traditional SMS message or other text-based format. Thus, the client can receive a notification that he or she might otherwise have missed because of an incompatibility between the client's device and the broadcast format of the original message.

Figure 7B:
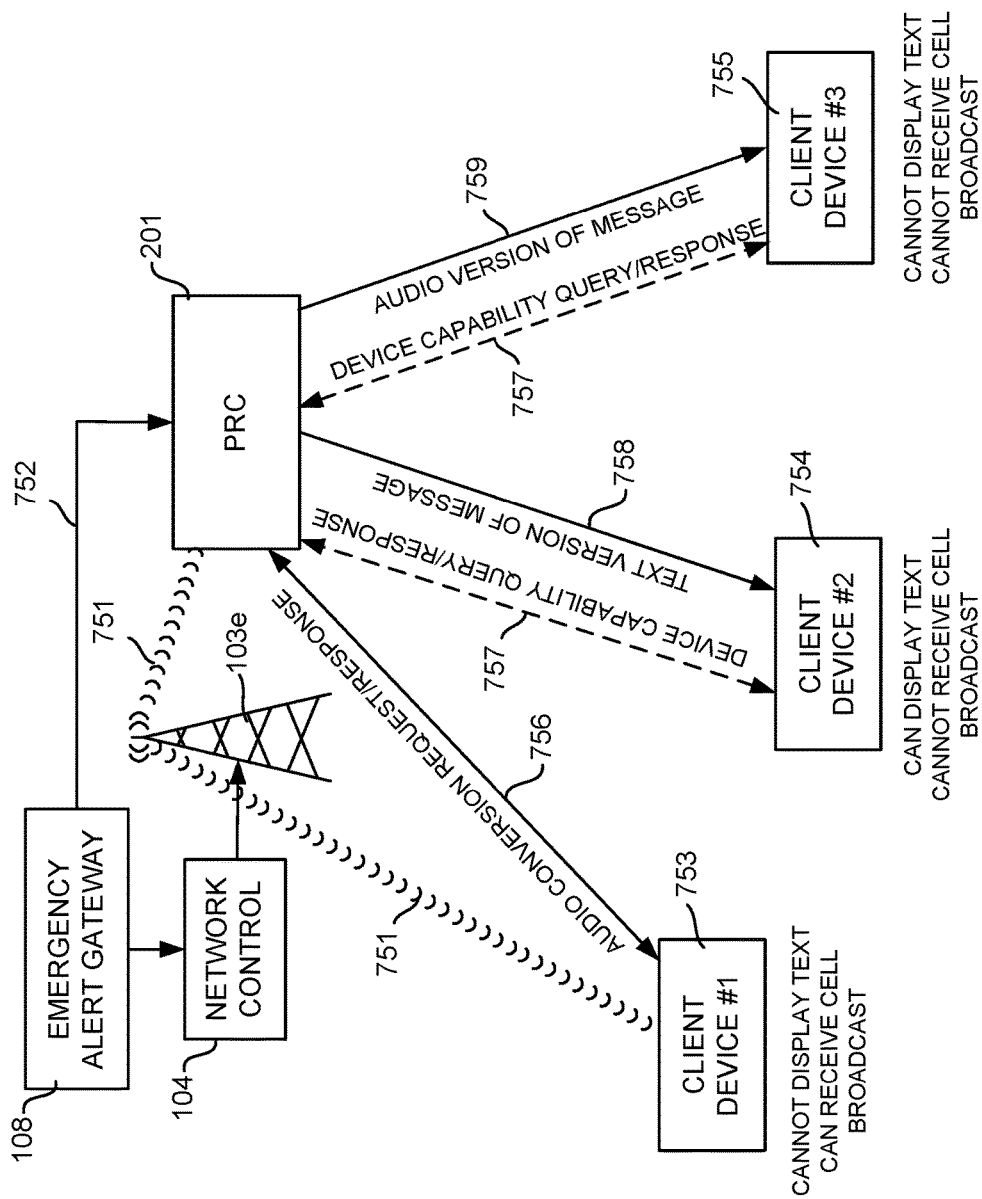
FIG. 7B illustrates additional embodiments.

FIG. 7B illustrates additional embodiments. In FIG. 7B, emergency alert gateway 108 issues a text-based emergency notification message targeted to persons in the area served by tower 103e. In this example, the emergency alert is communicated to phone network controller 104, and is broadcast from tower 103e using cell broadcast 751.

PRC 201 learns of the emergency alert by one or more methods. For example, if PRC 201 is located within the cell served by tower 103e, PRC 201 may receive the emergency alert message directly via cell broadcast 751. Alternatively or in addition, emergency alert gateway 108 may provide the text-based emergency notification directly to PRC 201 by some other channel 752, such as a landline telephone call, electronic mail, an SMS message or another means.

Devices 753, 754, and 755 are associated with respective clients of PRC 201, and are all within the area served by tower 103e. Client device 753 has the capability to receive cell broadcast messages, and so receives the text-based emergency notification directly from tower 103e. However, client devices 754 and 755 do not have the capability to receive cell broadcast messages, and therefore do not receive the emergency notification message despite being in the coverage area of tower 103*e*.

Client device 753 recognizes that the message is an emergency alert notification, and forwards 756 the emergency alert message to PRC 201 for conversion to audio. (The forwarding 756 will involve network infrastructure such as tower 103*e*, network controller 104, and other infrastructure, depending on the location of PRC 201. The communications between PRC 201 and client devices 753, 754, and 755 are simplified in FIG. 7B for ease of explanation.) In some embodiments, communication 756 of the text-based message from client device 753 to PRC 201 may be the manner in which PRC 201 learns of the emergency alert. In response to the request from client device 753, PRC 201 converts at least some of the content of the alert message into an audio format and sends it back to client device 753, which can then play the audio message to its respective user.

Once PRC 201 learns of the emergency alert notification, by whatever means, it may wish to alert other clients who may not have received the message for various reasons. PRC 201 can recognize the capabilities of devices 754 and 755, for example by accessing stored descriptions of these devices or by other means. In the example of FIG. 7B, PRC 201 queries devices 754 and 755 to determine their capabilities. The queries 757 can be accomplished by any of the methods described above. Based on the responses of devices 754 and 755 to the queries, PRC 201 may determine that neither device 754 nor device 755 can receive cell broadcast messages, and thus would not have received the original emergency alert message. In addition, PRC 201 may determine that device 754 can display text and that device 755 cannot.

Accordingly, PRC 201 can forward a text-based version 758 of the emergency alert to device 754, for example by a traditional SMS message, for display to the client user of device 754. PRC 201 can also forward an audio version 759 of the emergency alert to device 755, which can play the audio version for its respective client user. The audio version may be derived in any of the ways described above.

Thus, all three of devices 753, 754, and 755 can present versions of the emergency alert message to their respective users, who may otherwise not have received the alerts because of various incompatibilities between the format of the initial message and the capabilities of the various devices.

Other embodiments may combine aspects of the embodiments thus far described, in any workable combination. For example, PRC 201 may interact both with customers' communications devices that can receive CMAS alerts directly and those that cannot. For the devices that can receive CMAS alerts directly and contact PRC 201 for audio rendition, PRC 201 may perform the audio rendition and send data or signals back to each of the devices that requested rendition. At the same time, PRC 201 may receive notification of an emergency directly from emergency alert gateway 108, and may forward an audio rendition of that alert to one or more communications devices of clients identifiable as likely being in the area targeted by the emergency alert, including devices from which requests for rendition were not received.

In other embodiments, PRC 201 may take advantage of its unique position to render other kinds of assistance to its clients. In the event that a CMAS alert is sent, PRC 201 may well receive calls from a large number of clients in the affected area, and may use information about the calls or received from the callers in a variety of ways.

For example, with regard to a particular client, PRC 201 may provide follow-up calls to the client's communications device or contact the client via a different method, such as the client's landline telephone. If PRC 201 is unable to reach the client, emergency services may be called, especially if the client has an unusual situation such as being especially susceptible to danger from a particular emergency. PRC 201 may also call other persons previously listed by the client as emergency contacts. During such calls, whether initiated by the client or PRC 201, PRC 201 may obtain other useful information. For example, some callers may report that a wild fire is close enough to see, while other callers may report that no flames are visible. Coupling this information with geographical location information may enable PRC 201 to develop a very accurate map of the spread of a wild fire, especially of GPS information is available from some communications devices. In another example, callers may report traffic conditions on various evacuation routes, and PRC 201 may be able to suggest alternate routes to subsequent callers. Depending on the kinds of communications devices being used, some callers may be able to provide digital photographs or video of conditions at their locations.

In another example, upon receipt of the first request for audio conversion of a CMAS alert, personnel at PRC 201 may immediately research or retrieve information pertinent to the emergency, in anticipation of receiving calls from clients with specific concerns. For example, if a tornado warning is issued by CMAS alert, PRC 201 may immediately display tips for tornado survival to all customer service representatives at PRC 201. In another example, personnel at PRC 201 may immediately gather information from other sources, such as news reports, weather reports, or other information, so that customer service representatives 202 may be as completely informed as possible as clients call for assistance. PRC 201 may aggregate information from various sources and publish updates on an accessible Internet site, and may direct callers there for additional information and updates. The aggregated information may come from official sources, unofficial sources, or both. For example, PRC 201 may post digital photographs or videos submitted by clients.

In another example, PRC 201 may send electronic notification messages to persons who have been previously identified as emergency contacts or members of the client's personal care network who are nearby. Messages include detailed information about the CMAS alert to ensure that members of the care network are well informed about the situation. This information may also allow the client's local care network, for example, to physically follow up with an elderly relative who is known to have a particular physical ailment. PRC 201 may also send electronic messages to members of the personal care network who are not located nearby the client. This information may also allow the client's remote care network to stay informed so that they may provide assistance remotely as needed.

In another example, PRC 201 may broadcast electronic notification messages to persons in proximity to clients, such as persons who are not emergency services personnel but who have previously agreed to receive such messages in hopes of being able to act as "good Samaritans" in times of need. Systems and methods for such notifications are described in co-pending U.S. patent application Ser. No. 12/981,822 filed Dec. 30, 2010 and titled "Extended Emergency Notification Systems and Methods", the entire disclosure of which is hereby incorporated by reference herein for all purposes.

In some situations where PRC 201 attempts to contact a client, PRC 201 may recognize that during time of emergency, some communications avenues may be overtaxed and fail while some may not. PRC 201 may accordingly try multiple methods for reaching clients. For example, PRC 201 may attempt to reach a particular client by any one, any combination, or all of a cellular voice call, a cellular data call, a text-based message, a call to the client's landline telephone, and other communications channels.

In another example, PRC 201 may identify key witnesses to an event. These witnesses can be identified, for example, by the quality of content being submitted, through GPS verification, as a function of the witness' proximity to the event, or by other methods. Quality of content can be identified through work of customer service representative 202 or through an automated method such as crowdsourcing or an artificial intelligence algorithm. The PRC 201 may prioritize certain witnesses' updates and inputs as higher than others so that key witness information can be updated more often than others.

In another example, the device may have sensors (audio, barometer, magneto, pressure, accelerometer, proximity, physiological, vibration, tilt, etc.) that can be used to provide information to PRC 201. For example, the device may be able to detect vital signs from its user and notify PRC 201 that the user is alive. PRC 201 can then use this information to notify family members of this fact as well of the user's location.

In yet another example, PRC 201 can use all of the real time information it has gathered in the previous sections and act as an early warning system, where early signs of an emergency can be used to feed into Emergency alert gateway 108. Emergency alert gateway 108 can then in turn take this data to issue a formal CMAS alert to affected areas.

Figure 8:
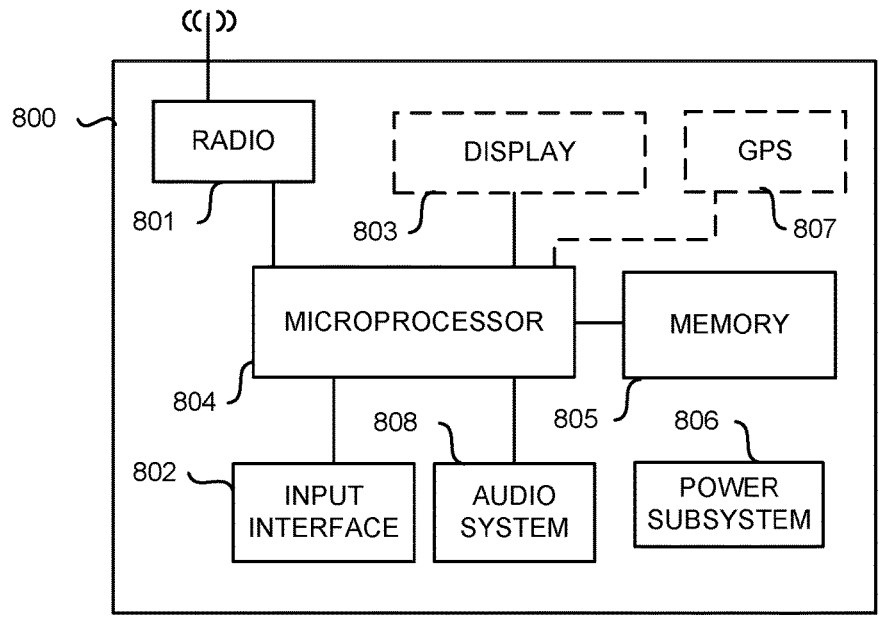
FIG. 8 illustrates a simplified block diagram of a communications device suitable for use in embodiments.

FIG. 8 illustrates a simplified block diagram of a communications device 800, suitable for use in embodiments. Communications device 800 may be a simplified communications device such as communications device 206, may be a mobile telephone such as mobile telephone 105c, or may be another kind of communications device. Communications device 800 includes a radio transceiver 801 for communicating with network 100, and an input interface 802 for receiving inputs from the user of communications device 802. Input interface 802 may include a single button or a multi-key keypad, and may include a microphone, an accelerometer, or other input devices. A display 803 may optionally be included for communicating information to the user. Display 803, if included, may comprise any means of visually communicating information to the user. For example, display 803 may comprise a backlit or passive liquid crystal display (LCD) or another kind of display capable of showing graphical or alphanumeric information. Display 803 could comprise a simple set of indicator lights, for example made of light emitting diodes or another kind of light source. Many other kinds of displays are possible. The operation of communications device 800 is controlled by a microprocessor 804 executing instructions stored in a computer readable memory 805. The instructions, when executed by microprocessor 804, cause communications device 800 to perform steps in accordance with embodiments. Computer readable memory 805 may include volatile memory, non-volatile memory, reprogrammable memory, or a combination of these. Microprocessor 804 may be any suitable kind of processor, for example a complex instruction set microprocessor, a reduced instruction set microprocessor, a digital signal processor, a microcontroller, or any other circuitry or combination of components that performs similar functions. A power subsystem 806 routes power to the other components. Optionally, a global positioning system (GPS) receiver 807 may be included, enabling communications device 800 to accurately determine its location via GPS. In some embodiments, the power subsystem may include a battery and provision for recharging the battery. An audio system 808 may include such items as a microphone and a speaker, and may provide for audio communication with the user. Other audio functions may also be provided. The depiction of communications device 800 in FIG. 8 is simplified, and other components may be present.

Figure 9:
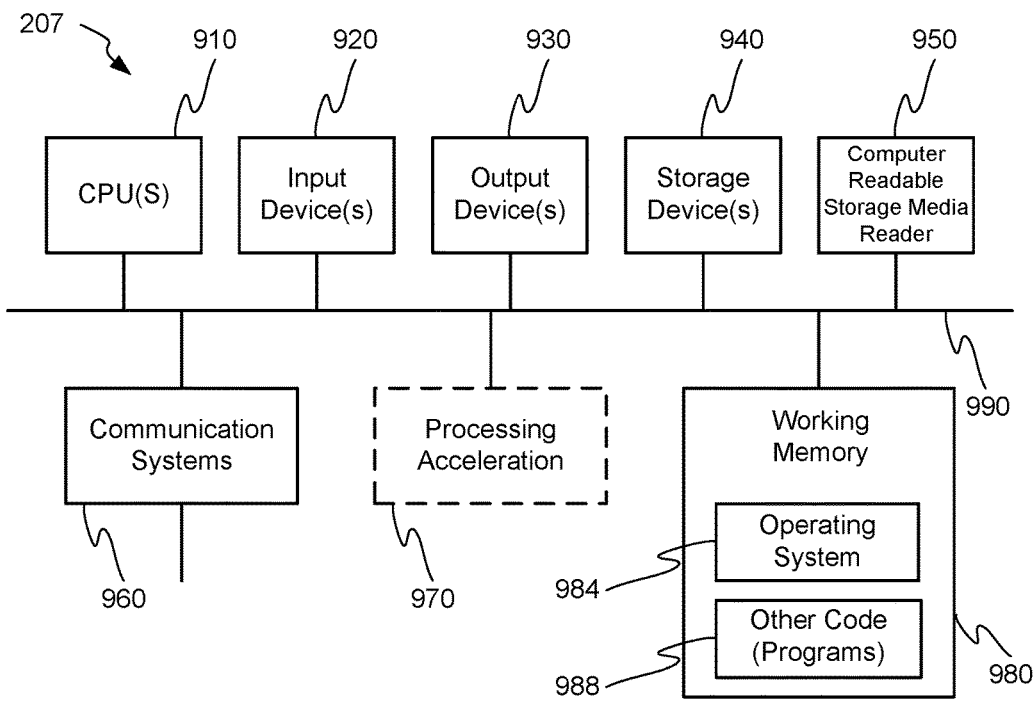
FIG. 9 illustrates a simplified block diagram of an example embodiment of the internal structure of a computer system.

Many of the functions of PRC 201 may be performed by or with the assistance of computer system 207. FIG. 9 illustrates a simplified block diagram of an example embodiment of the internal structure of computer system 207. The computer system 207 is shown comprising hardware elements that may be electrically coupled via a bus 990. The hardware elements may include one or more central processing units 910, one or more input devices 920 (e.g., a keyboard, mouse, or other input device of combination of devices), and one or more output devices 940 (e.g., a display, printer, or other device or combination of devices). The computer system 207 may also include one or more storage device(s) 940. By way of example, storage device(s) 940 may be disk drives, optical storage devices, solid-state storage device such as a random access memory ("RAM") and/or a read-only memory ("ROM"), which can be programmable, flash-updateable and/or the like.

The computer system 207 may additionally include a computer-readable storage media reader 950, a communications system 960 (e.g., a modem, a network card (wireless or wired), an infra-red communication device, Bluetooth™ device, cellular communication device, etc.), and working memory 980, which may include RAM and ROM devices as described above. In some embodiments, the computer system 207 may also include a processing acceleration unit 970, which can include a digital signal processor, a special-purpose processor and/or the like.

The computer-readable storage media reader 950 can further be connected to a computer-readable storage medium, together (and, optionally, in combination with storage device(s) 940) comprehensively representing remote, local, fixed, and/or removable storage devices plus storage media for temporarily and/or more permanently containing computer-readable information. The communications system 960 may permit data to be exchanged with a network, system, computer and/or other component described above.

The computer system 207 may also comprise software elements, shown as being currently located within a working memory 980, including an operating system 984 and/or other code 988. It should be appreciated that alternate embodiments of a computer system 207 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 207 may include code 988 for implementing any or all of the function of the various elements of the architecture as described herein. For example, software, stored on and/or executed by a computer system such as system 207, can provide some of the functions of private response center 201 such as those discussed above. Methods implementable by software on some of these components have been discussed above in more detail.

As is discussed above, PRC 201 may call one or more the client's emergency contacts once PRC 201 learns that the client's phone has received a CMAS alert. In other embodiments, PRC 201 may provide other mechanisms for a client's emergency contacts or other persons or entities to receive information about the client's status, about incidents occurring in the client's life, or other information.

For example, PRC 201 may send automated notifications to some or all of the client's designated contacts or other entities.

Figure 10:
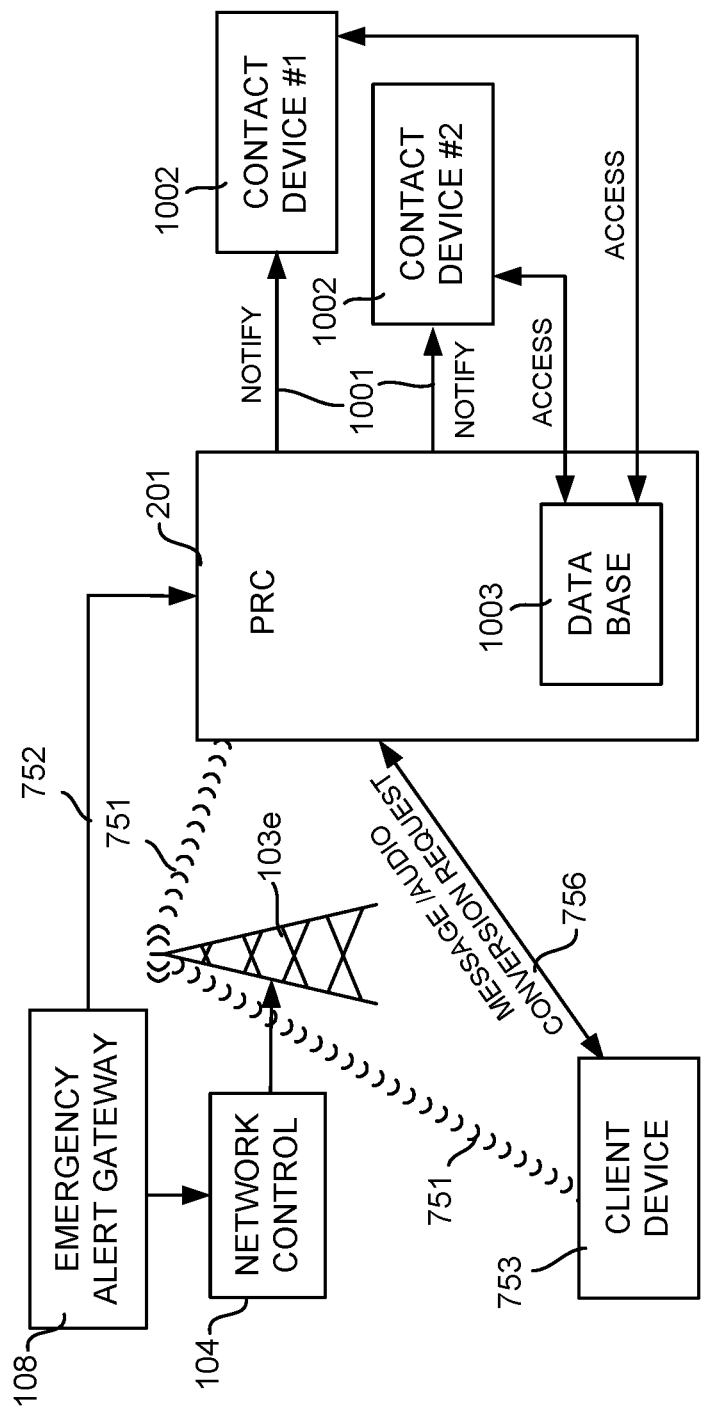
FIG. 10 illustrates a system in accordance with embodiments of the invention.

FIG. 10 illustrates a system in which such features may be embodied. As before, emergency alert gateway 108 issues a text-based electronic emergency notification message, for example a CMAS alert. A communication device 753 associated with a particular client of PRC 201 receives the message, and forwards 756 the message to PRC 201. This forwarding may include an explicit or implied request that the alert message converted to an audio format as is described above, or device 753 may be programmed to report such alerts as a matter of course. PRC may learn of the emergency alert by other channels 751, 752 as well.

In response to the indication that device 753 has received the text-based electronic emergency notification message, PRC 201 notifies 1001 one or more persons or other entities, by communicating with devices 1002 associated with the entities, of the fact that the particular client's device 753 has received the message. The notified entities are preferably designated in the client's personal profile to receive such notifications. The designated entities may include some or all of the emergency contacts designated by the client, as shown in FIG. 5, but may include other persons or entities as well.

The notifications 1001 may take any suitable form, for example text messages such as SMS messages, electronic mail messages, or other kinds of notifications. Different message formats may be used for different notified entities. A preferred message format for each entity to be notified may be recorded in the client's personal profile, and may be changed to reflect changes in client or entity preference.

Different notified entities may use different kinds of devices 1002, and the preferred message format for each entity may depend on the capabilities of a particular notified entity's device 1002. For example, different notified entities may prefer to receive simple text messages such as SMS messages, or recorded voicemail messages as notifications that client device 753 has received an emergency alert. Other entities, for example entities using computers or phones with computer-like capabilities, may prefer to receive electronic mail messages. In some embodiments, the notifications sent to client devices 1002 may include content from the original text-based electronic emergency notification message, for example as text, audio derived from the original text, or both.

FIG. 11 illustrates a simplified example personal profile in accordance with embodiments of the invention. In the personal profile of FIG. 11, each of the listed contacts has been designated for receiving information about the client. Different contacts may be afforded different levels of information access. In some embodiments, entities that are listed as contacts that may be called in the event of an emergency or the like on the part of the client may be given general access to information about the client, for example database information as described below.

FIG. 11 also illustrates that different entities may have different preferences for how notifications should be sent to each entity.

PRC 201 may include in the notifications sent to devices 1002 additional information related to the cause of the text-based electronic emergency notification message. For example, if a CMAS alert sent to a client device such as device 753 involves a recommendation from the authorities to evacuate due to a wildfire, PRC 201 may provide map showing preferred evacuation routes in the notifications, or an Internet link to such a map. In another example, if the original CMAS alert pertains to a power outage, PRC 201 may provide in the notifications information or a link to information about how to avoid food spoilage during a power outage.

In some embodiments, PRC 201 may apply one or more filter criteria to text-based electronic emergency notification messages received from client devices such as device 753, and may, in accordance with the filter criteria, may decide not to transmit notification to some or all of entity devices 1002 that the client device has received a particular text-based electronic emergency notification message. The one or more filter criteria may include a criterion based on the geographical location of the client's device. For example, if client device 753 has recently reported its position such that PRC 201 knows the particular client is at home on a high bluff, it may be determined that a tsunami warning message need not be forwarded.

PRC 201 may also record certain events occurring in the lives of clients in a database 1003, and may make the database accessible to the client's emergency contacts or other designated entities, so that the client's caregivers can be informed of the client's status. For example, client device 753 may periodically report its geographical location to PRC 201, which may record the reported position in database 1003. The client's designated entities may use devices 1002 to access database 1003 to remain informed of the client's whereabouts. PRC 201 may also send alerts to certain contacts when certain events occur. For example, the reported location of a client's device may be compared with a prescribed geographical area, and the client's contacts may be notified if the client's device moves outside the prescribed area. Thus, the caregivers of a client who is prone to wander can be quickly notified if a wandering episode appears to be occurring.

A portion of database 1003 may be accessible to authorized contacts of the client, for example as a page served on the World Wide Web. Preferably, each designated contact is permitted to access only information relating to the particular client for whom the contact's access is authorized.

According to embodiments of the invention, PRC 201 may record in database 1003 that client devices have received text-based electronic emergency notification messages. Thus, entities having access to the portion of database 1003 relating to the particular client can be informed as to the client's situation. In some cases, the designated entities may receive both a notification such as notifications 1001 "pushed" to the entities' devices 1002, and then may be prompted to consult database 1003 for additional information that can be "pulled" from database 1003. Not all designated entities may have the same privileges. For example, some entities may receive pushed notifications, but may not be eligible to pull data from database 1003. Other entities may be able to pull information from database 1003 but may not receive pushed notifications. Some entities may receive pushed notifications and may also be able to pull data from database 1003. The ability to receive pushed notifications or to pull data from database 1003 may depend on the capabilities of the device being used by a particular entity.

Figure 12:
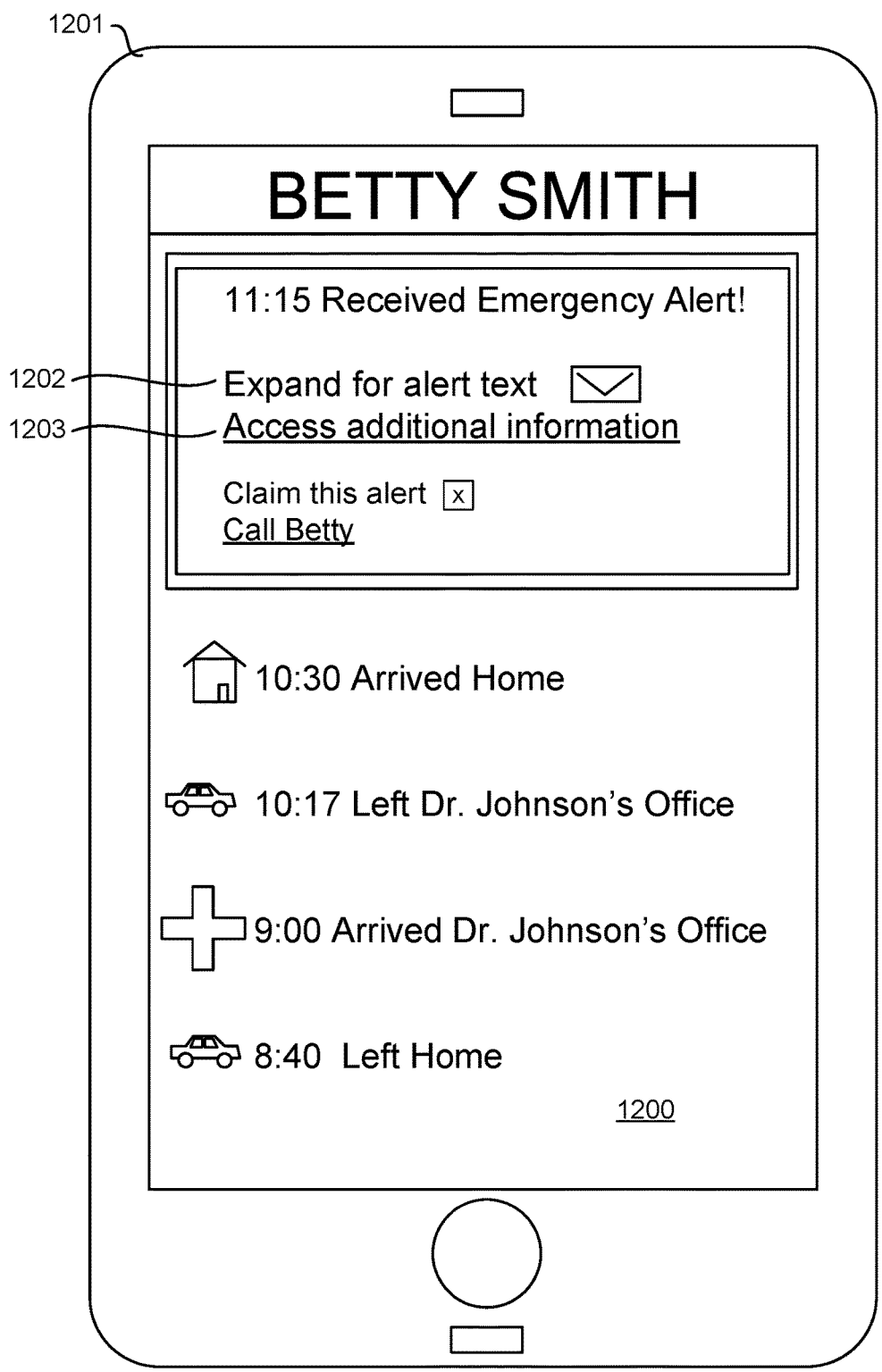
FIG. 12 illustrates a screen of a communication device such as a "smart" phone used to access a data base in relation to a particular client, in accordance with embodiments of the invention.

FIG. 12 illustrates a screen 1200 of a communication device 1201 such as a "smart" phone used to access database 1003 in relation to a particular client, in accordance with embodiments of the invention. Screen 1200 may be presented, for example, by a software application running on device 1201, and may present information from database 1003. In this example screen, some location-based events are displayed, and also the receipt by the monitored client's device of an emergency alert such as a CMAS alert is indicated. User interface selections may be provided for accessing additional information, for example the text of the original alert 1202, or supplemental information made available 1203 by PRC 201.

Figure 13:
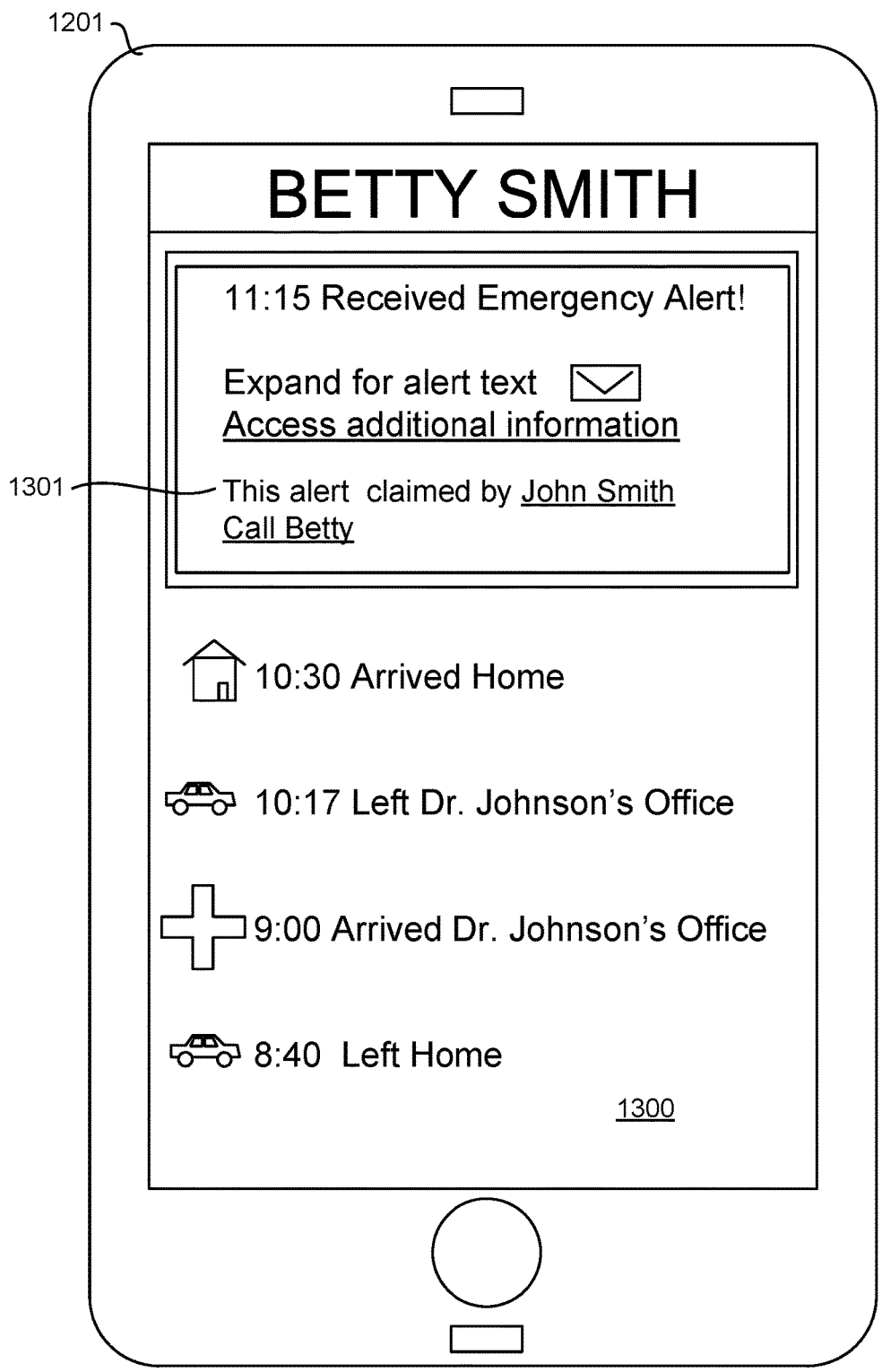
FIG. 13 shows a modified user interface screen, in accordance with embodiments of the invention.

In accordance with some embodiments, the persons or other entities who receive notifications that the client's device has received an emergency alert may be given the opportunity to "claim" the alert event. That is, one of the notification recipients may indicate that he or she will take responsibility for following up with the client, for example to verify that the client does not need any particular assistance, or to provide assistance as needed. Once an alert is claimed in this manner, database 1003 may be updated to reflect the claiming, so that other notification recipients will know that the situation is being handled. For example, FIG. 13 shows a modified user interface screen 1300 showing that another recipient has already claimed 1301 the alert.

PRC 201 may monitor database 1003 to determine whether alerts to client devices have been claimed, and may choose to follow up on alerts that are not claimed within a predetermined time. For example, if an alert to a particular client's device goes unclaimed for three hours, PRC 201 may initiate a telephone call to that client, to verify that the client needs no assistance, or to provide assistance as needed. Other predetermined time periods may be used, and the predetermined time period for any particular client may be adjustable, for example depending on client preference, client health, or other factors.

Figure 14:
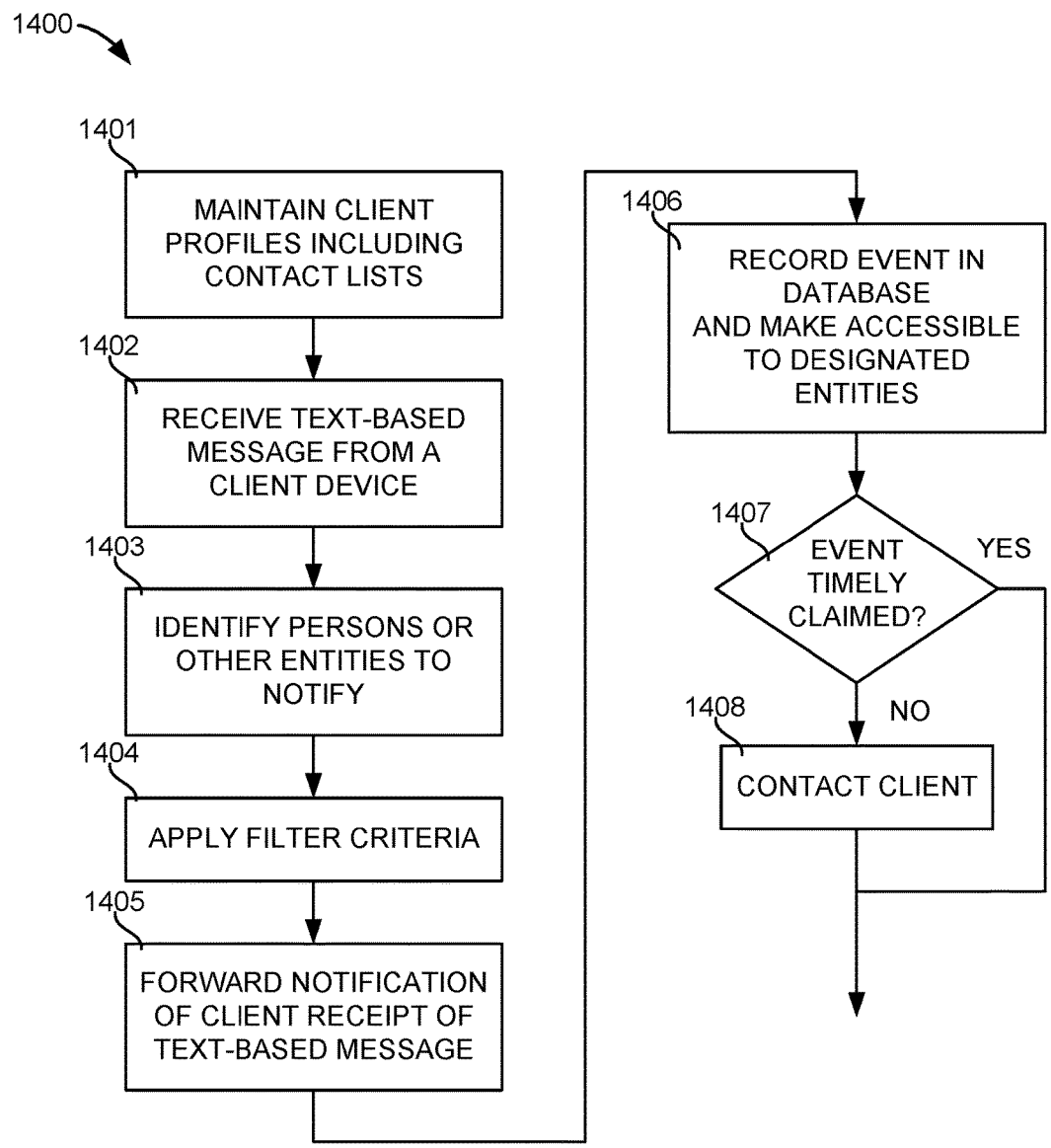
FIG. 14 illustrates a method in accordance with embodiments of the invention.

FIG. 14 illustrates a method 1400 in accordance with embodiments of the invention, as may be performed by PRC 201. In step 1401, PRC 201 maintains personal profiles pertaining to a number of clients. FIGS. 5 and 11 illustrate simplified examples of such profiles. The profiles include contact information for entities designated by the respective clients for receiving information about the respective clients from the call center. In step 1402, PRC 201 receives, via an electronic network from a communication device associated with a particular one of the clients, a text-based electronic emergency notification message originating from an emergency alert gateway. In step 1403, PRC 201 identifies one or more persons or other entities to notify that the client device received the alert message. For example, PRC 201 may consult the personal profile of the particular client whose device received the alert and sent it to PRC 201.

In step 1404, PRC 201 may apply one or more filter criteria, to determine whether to forward in a notification that the client's device received the emergency alert. Presuming it is decided that notification is to be sent, one or more notifications are sent at step 1405. As is discussed above, the notifications may be sent by any suitable means, which may be selected based on the preferences of the client and each intended notification recipient. At step 1406, the alert event is recorded in a database, and the database is made accessible to persons or other entities designated by the client. In steps 1407 and 1408, PRC 201 may monitor the database to see if the event is "claimed" by any of the notified entities. If not, PRC 201 may contact the client directly.

While the principles of the disclosure have been described above in connection with specific apparatuses and methods, it is to be clearly understood that this description is made only by way of example and not as limitation on the scope of the disclosure.

What is claimed is:

1. A method of operating a call center, the method comprising:
    maintaining in electronic storage, by a computer system comprising a processor executing a program stored in a memory, personal profiles of a number of clients of a service provided by the call center, wherein each of at least some of the personal profiles includes contact information for one or more entities designated by the respective client for receiving information about the respective client from the call center;
    receiving, via an electronic network from a communication device associated with a particular one of the clients, a text-based electronic emergency notification message, wherein the personal profile of the particular client includes contact information for one or more entities designated by the particular client for receiving information about the particular client from the call center; and
    pushing, to one or more of the entities designated in the personal profile of the particular client, a notification that the communication device associated with the particular client received the text-based electronic emergency notification message;
    wherein the notification is configured to activate an application, on a device used by at least one of the entities to which the notification is pushed, to display the notification.

2. The method of claim 1, further comprising:
    deriving, from the content of the text-based electronic emergency notification message, data or signals that render at least some of the content of the text-based electronic emergency notification message into an audio format; and
    transmitting the data or signals to either or both of the communication device associated with the particular client and one or more devices associated with the entities designated in the personal profile of the particular client.

3. The method of claim 1, further comprising recording, in a database accessible via the electronic network to one or more devices associated with the entities designated in the personal profile of the particular client, the receipt of the text-based electronic emergency notification message from the communication device associated with the particular client.

4. The method of claim 3, further comprising:
    making information from the database accessible to the one or more devices associated with the entities designated in the personal profile of the particular client.

5. The method of claim 4, wherein making information from the database accessible to the one or more devices associated with the entities designated in the personal profile of the particular client comprises serving content from the database as a page on the World Wide Web.

6. The method of claim 4, wherein making information from the database accessible to the one or more devices associated with the entities designated in the personal profile of the particular client comprises making information from the database accessible for pulling by one or more devices associated with the entities designated in the personal profiles of the particular clients.

7. The method of claim 3, wherein recording the receipt of the text-based electronic emergency notification message in the database includes recording the content of the text-based electronic emergency notification message in the database such that the content of the text-based electronic emergency notification message is accessible via the electronic network to the one or more devices associated with the entities designated in the personal profile of the particular client.

8. The method of claim 3, wherein the receipt of the text-based electronic emergency notification message constitutes an event, the method further comprising:
receiving from one of the devices associated with a particular entity designated in the personal profile of the particular client an indication that the particular entity has claimed the event; and
making available to any other devices associated with entities designated in the personal profile of the particular client an indication that the particular entity has claimed the event.

9. The method of claim 3, wherein the receipt of the text-based electronic emergency notification message constitutes an event, the method further comprising:
providing a mechanism for entities designated in the personal profile of the particular client to claim the event; and
when no entity has claimed the event within a predetermined time, contacting the particular client.

10. The method of claim 1, further comprising:
receiving, via the electronic network from a communication device associated with a particular one of the clients, a second text-based electronic emergency notification message, wherein the personal profile of the particular client includes contact information for one or more entities designated by the particular client for receiving information about the particular client from the call center;
applying one or more filter criteria to the second text-based electronic emergency notification message; and
in accordance with the one or more filter criteria, determining that no indication that the communication device associated with the particular client received the second text-based message will be transmitted.

11. The method of claim 10, wherein the filter criteria include a criterion based on the geographical location of the communication device associated with the particular client.

12. The method of claim 1, further comprising:
supplementing the notification forwarded to the one or more of the entities designated in the personal profile of the particular client that the communication device associated with the particular client received the text-based message with additional information related to the cause of the text-based electronic emergency notification message.

13. The method of claim 1, wherein:
the notification that the communication device associated with the particular client received the text-based electronic emergency notification message is pushed to at least two of the entities designated in the personal profile of the particular client; and
the notification is sent to a first one of the at least two entities designated in the personal profile of the particular client in a first format and is sent to a second one of the at least two entities designated in the personal profile of the particular client in a second format different from the first format, the first and second formats having been selected based on the capabilities of the devices used by the first and second ones of the at least two entities.

14. A method of operating a call center, the method comprising:
maintaining in electronic storage, by a computer system comprising a processor executing a program stored in a memory, personal profiles of a number of clients of a personalized assistance service provided by the call center, wherein each of at least some of the personal profiles includes contact information for one or more entities designated and authorized by the respective client for receiving information about the respective client from the call center;
receiving, via an electronic network from a plurality of communication devices associated with particular ones of the clients, notifications of events occurring in the lives of particular clients, the events having been automatically recognized by the respective communication devices associated with the particular clients;
recording in a database indications of the receipt of the event notifications from the communication devices associated with the particular clients;
making information from the database accessible for pulling by one or more devices associated with the entities designated in the personal profiles of the particular clients, wherein each of the devices associated with the designated entities is permitted to access only information relating to the respective particular client for whom the respective entity's access is authorized; and
pushing, to one or more of the devices associated with the entities designated in the personal profiles of the particular clients, notifications of the occurrences of at least some of the events, wherein the notifications are configured to activate applications on the respective devices to display the notifications.

15. The method of claim 14, wherein making information from the database accessible to the one or more devices associated with the entities designated in the personal profile of the particular clients comprises serving content from the database as one or more pages on the World Wide Web.

16. The method of claim 14, wherein making information from the database accessible to the one or more devices associated with the entities designated in the personal profile of the particular clients comprises making the information available in a format accessible by an application program running on one or more devices associated with the entities designated in the personal profiles of the particular clients.

17. The method of claim 14, further comprising:
receiving from one of the devices associated with a particular entity designated in the personal profile of a particular one of the clients an indication that the particular entity has claimed one of the events; and
making available to at least one other device associated with another entity designated in the personal profile of the particular one of the clients an indication that the particular entity has claimed the event.

18. The method of claim 14, wherein one of the events comprises the detection by a sensor comprised in the communication device associated with a particular one of the clients of a physiological parameter of the particular one of the clients.

19. The method of claim 14, wherein at least two entities are designated by a particular one of the clients for receiving information about the particular one of the clients from the call center, and where one of the designated entities is afforded a different level of access to information in the database than another one of the designated entities.

20. The system of claim 19, wherein one of the event notifications is sent to a first one of the devices associated with the entities designated in the personal profiles of the particular clients in a first format and is sent to a second one of the devices associated with the entities designated in the personal profiles of the particular clients in a second format different from the first format, the first and second formats having been selected based on the capabilities of the first and second devices.

21. The method of claim 14, wherein one of the notifications is sent to a first one of the devices associated with the entities designated in the personal profiles of the particular clients in a first format and is sent to a second one of the devices associated with the entities designated in the personal profiles of the particular clients in a second format different from the first format, the first and second formats having been selected based on the capabilities of the first and second devices.

22. A system, comprising:
  a computer system including a processor and memory, the memory holding instructions that, when executed by the processor, cause the computer system to:
  maintain in electronic storage personal profiles of a number of clients of a personalized assistance service, wherein each of at least some of the personal profiles includes contact information for one or more entities designated and authorized by the respective client for receiving information about the respective client from the call center;
  receive, via an electronic network from a plurality of communication devices associated with particular ones of the clients, notifications of events occurring in the lives of particular clients, the events having been automatically recognized by the respective communication devices associated with the particular clients;
  record in a database indications of the receipt of the event notifications from the communication devices associated with the particular clients;
  make information from the database accessible for pulling by one or more devices associated with the entities designated in the personal profiles of the particular clients, wherein each of the entities is permitted to access only information relating to the respective particular client for whom the entity's access is authorized; and
  push the event notifications to the plurality of devices associated with the entities designated in the personal profiles of the particular clients, wherein each event notification is pushed only to devices associated with one or more entities permitted to receive notifications about the respective client; and
  the plurality of communication devices associated with particular ones of the entities associated with the clients, each of the plurality of communication devices including a processor and memory, the memory holding an application program that, when run by the processor, causes the respective communication device to access information from the database relating to the particular one of the clients who has permitted information access to the respective entity;
  wherein receipt of an event notification by one of the communication devices associated with the entities designated in the personal profiles of the particular clients activates the application program to display the event notification.

\* \* \* \* \*